United States Patent
Murakami

(10) Patent No.: US 12,007,497 B2
(45) Date of Patent: Jun. 11, 2024

(54) ELECTRONIC DEVICE, CONTROL METHOD OF ELECTRONIC DEVICE, AND CONTROL PROGRAM OF ELECTRONIC DEVICE

(71) Applicant: KYOCERA Corporation, Kyoto (JP)

(72) Inventor: Youhei Murakami, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 518 days.

(21) Appl. No.: 17/268,111

(22) PCT Filed: Aug. 2, 2019

(86) PCT No.: PCT/JP2019/030534
§ 371 (c)(1),
(2) Date: Feb. 12, 2021

(87) PCT Pub. No.: WO2020/044959
PCT Pub. Date: Mar. 5, 2020

(65) Prior Publication Data
US 2021/0199754 A1    Jul. 1, 2021

(30) Foreign Application Priority Data

Aug. 29, 2018 (JP) .................................. 2018-160777

(51) Int. Cl.
*G01S 7/03* (2006.01)
*G01S 7/35* (2006.01)
*G01S 13/04* (2006.01)
*G01S 13/931* (2020.01)
*H04B 7/06* (2006.01)

(52) U.S. Cl.
CPC ................ *G01S 7/03* (2013.01); *G01S 13/04* (2013.01); *G01S 13/931* (2013.01); *H04B 7/06* (2013.01); *G01S 7/35* (2013.01); *G01S 2013/9314* (2013.01)

(58) Field of Classification Search
CPC .......... G01S 13/931; G01S 2013/9314; B60W 30/06; B62D 15/0285
USPC .................................. 342/70, 27; 340/932.2
See application file for complete search history.

(56) References Cited

U.S. PATENT DOCUMENTS

| 4,347,618 | A * | 8/1982 | Kavouras ................ G01S 7/003 375/259 |
| 6,583,753 | B1 * | 6/2003 | Reed ..................... G01S 13/931 342/72 |

(Continued)

FOREIGN PATENT DOCUMENTS

| CN | 105022064 A | 11/2015 |
| JP | 2007022280 A | 2/2007 |

(Continued)

*Primary Examiner* — Vladimir Magloire
*Assistant Examiner* — Michael W Justice
(74) *Attorney, Agent, or Firm* — Studebaker & Brackett PC

(57) ABSTRACT

An electronic device comprises a controller that performs control to switch between a first mode and a second mode. In the first mode, the controller transmits first transmission waves from a plurality of transmission antennas installed in a mobile body. In the second mode, the controller transmits second transmission waves beamformed from the transmission antennas. The controller performs control to switch from the first mode to the second mode, when detecting a stop space for the mobile body.

9 Claims, 11 Drawing Sheets

(56) References Cited

U.S. PATENT DOCUMENTS

| | | | | |
|---|---|---|---|---|
| 6,819,284 B2* | 11/2004 | Maier | | H01Q 1/3233 |
| | | | | 340/932.2 |
| 7,248,215 B2* | 7/2007 | Pleva | | H01Q 25/002 |
| | | | | 342/368 |
| 7,724,180 B2* | 5/2010 | Yonak | | H01Q 25/002 |
| | | | | 343/753 |
| 7,978,096 B2* | 7/2011 | Reed | | G01S 13/931 |
| | | | | 340/932.2 |
| 8,072,352 B2* | 12/2011 | Reed | | G01S 13/931 |
| | | | | 340/932.2 |
| 8,169,359 B2* | 5/2012 | Aoyagi | | G01S 13/582 |
| | | | | 342/134 |
| 8,700,258 B2* | 4/2014 | Tate, Jr. | | B60L 53/37 |
| | | | | 340/475 |
| 9,120,425 B2* | 9/2015 | Tate, Jr. | | B60L 53/126 |
| 9,418,551 B2* | 8/2016 | Kavaler | | B60W 30/06 |
| 9,573,624 B2* | 2/2017 | Mori | | G01S 15/931 |
| 9,632,177 B2* | 4/2017 | Inagaki | | G01S 15/876 |
| 9,664,777 B2* | 5/2017 | Kishigami | | G01S 7/023 |
| 9,884,621 B2* | 2/2018 | Tarte | | G08G 1/0965 |
| 10,252,714 B2* | 4/2019 | Johnson | | B60W 30/06 |
| 10,330,775 B2 | 6/2019 | Fujibayashi | | |
| 10,571,562 B2* | 2/2020 | Wodrich | | G01S 13/878 |
| 10,630,249 B2* | 4/2020 | Rao | | H03B 5/1228 |
| 10,788,580 B1* | 9/2020 | Kavaler | | G01S 13/0209 |
| 10,906,532 B2* | 2/2021 | Lee | | B60W 50/082 |
| 11,092,674 B2* | 8/2021 | Warke | | G01S 7/4865 |
| 2003/0058132 A1* | 3/2003 | Maier | | G01S 13/931 |
| | | | | 340/932.2 |
| 2006/0145919 A1* | 7/2006 | Pleva | | H01Q 1/3283 |
| | | | | 342/368 |
| 2008/0272955 A1* | 11/2008 | Yonak | | H01Q 15/0086 |
| | | | | 342/54 |
| 2009/0254260 A1* | 10/2009 | Nix | | G01S 15/10 |
| | | | | 348/148 |
| 2009/0284407 A1* | 11/2009 | Aoyagi | | G01S 13/532 |
| | | | | 342/110 |
| 2010/0271237 A1* | 10/2010 | Reed | | G01S 13/931 |
| | | | | 340/932.2 |
| 2010/0271238 A1* | 10/2010 | Reed | | G01S 13/931 |
| | | | | 340/932.2 |
| 2013/0235366 A1* | 9/2013 | Giacotto | | G01S 17/10 |
| | | | | 356/5.01 |
| 2013/0241766 A1* | 9/2013 | Kishigami | | G01S 7/0235 |
| | | | | 342/159 |
| 2014/0074352 A1* | 3/2014 | Tate, Jr. | | B60R 1/002 |
| | | | | 701/36 |
| 2014/0095021 A1* | 4/2014 | Tate | | B60L 53/37 |
| | | | | 701/36 |
| 2014/0225763 A1* | 8/2014 | Kavaler | | G08G 1/142 |
| | | | | 342/70 |
| 2014/0355385 A1* | 12/2014 | Inagaki | | G01S 15/931 |
| | | | | 367/99 |
| 2016/0280263 A1* | 9/2016 | Mori | | B62D 15/027 |
| 2017/0045613 A1* | 2/2017 | Wang | | G01S 13/343 |
| 2017/0276788 A1* | 9/2017 | Wodrich | | G01S 13/931 |
| 2017/0315231 A1* | 11/2017 | Wodrich | | G01S 13/87 |
| 2017/0355307 A1* | 12/2017 | Ha | | G08G 1/168 |
| 2017/0361835 A1* | 12/2017 | Tarte | | B62D 15/027 |
| 2018/0043884 A1* | 2/2018 | Johnson | | B60W 10/184 |
| 2018/0095173 A1* | 4/2018 | Kurono | | G01S 13/343 |
| 2018/0335512 A1* | 11/2018 | Brankovic | | G01S 13/584 |
| 2019/0018107 A1* | 1/2019 | Warke | | G01S 7/4865 |
| 2019/0044485 A1* | 2/2019 | Rao | | G01S 13/931 |
| 2019/0111916 A1* | 4/2019 | Lee | | B62D 15/0285 |
| 2021/0325515 A1* | 10/2021 | Warke | | G01S 7/484 |

FOREIGN PATENT DOCUMENTS

| | | |
|---|---|---|
| KR | 20100065455 A | 6/2010 |
| WO | 2016167253 A1 | 10/2016 |

* cited by examiner

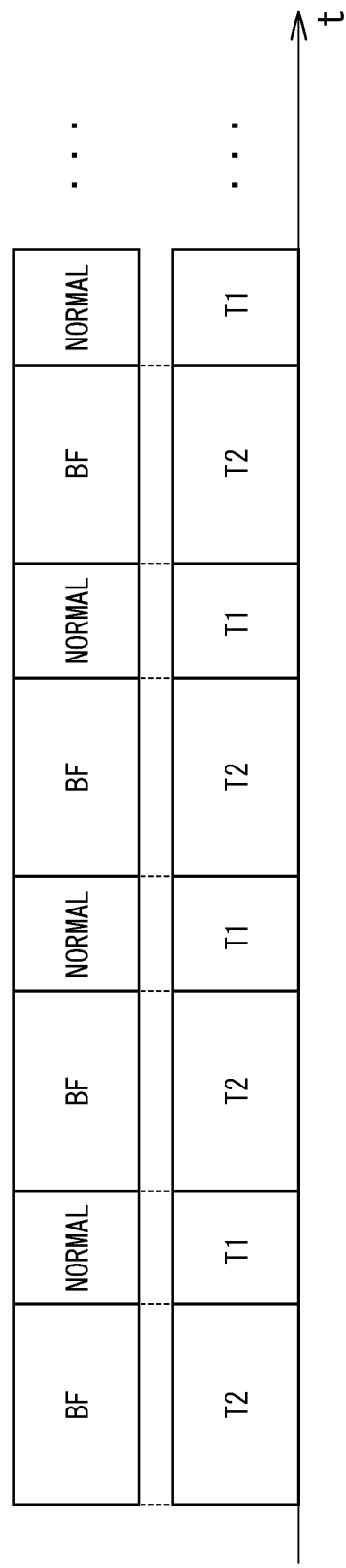

ELECTRONIC DEVICE, CONTROL METHOD OF ELECTRONIC DEVICE, AND CONTROL PROGRAM OF ELECTRONIC DEVICE

CROSS REFERENCE TO RELATED APPLICATION

This application claims priority to and the benefit of Japanese Patent Application No. 2018-160777 filed on Aug. 29, 2018, the entire disclosure of which is incorporated herein by reference.

TECHNICAL FIELD

The present disclosure relates to an electronic device, a control method of an electronic device, and a control program of an electronic device.

BACKGROUND

In fields such as automobile-related industry, techniques of measuring, for example, the distance between a vehicle and an object are considered important. In particular, various techniques of radar (radio detecting and ranging) that measures, for example, the distance from an object such as an obstacle by transmitting radio waves such as millimeter waves and receiving reflected waves reflected off the object are studied in recent years. The importance of such techniques of measuring distance and the like is expected to further increase in the future, with the development of techniques of assisting the driver in driving and techniques related to automated driving whereby driving is wholly or partly automated.

CITATION LIST

Patent Literature

PTL 1: WO 2016/167253 A1

SUMMARY

An electronic device according to an embodiment comprises a controller that performs control to switch between a first mode and a second mode. In the first mode, the controller transmits transmission waves from a plurality of transmission antennas installed in a mobile body. In the second mode, the controller transmits second transmission waves beamformed from the transmission antennas. The controller switches from the first mode to the second mode, when detecting a stop space for the mobile body.

A control method of an electronic device according to an embodiment comprises: (1) transmitting first transmission waves from a plurality of transmission antennas installed in a mobile body; (2) transmitting second transmission waves beamformed from the transmission antennas; and (3) performing control to switch from the transmitting of the first transmission waves to the transmitting of the second transmission waves, when detecting a stop space for the mobile body.

A control program of an electronic device according to an embodiment causes a computer to execute the foregoing (1) to (3).

BRIEF DESCRIPTION OF THE DRAWINGS

In the accompanying drawings:

FIG. 11 is a diagram illustrating part of operation in the flowchart in FIG. 8.

DETAILED DESCRIPTION

Figure 1:
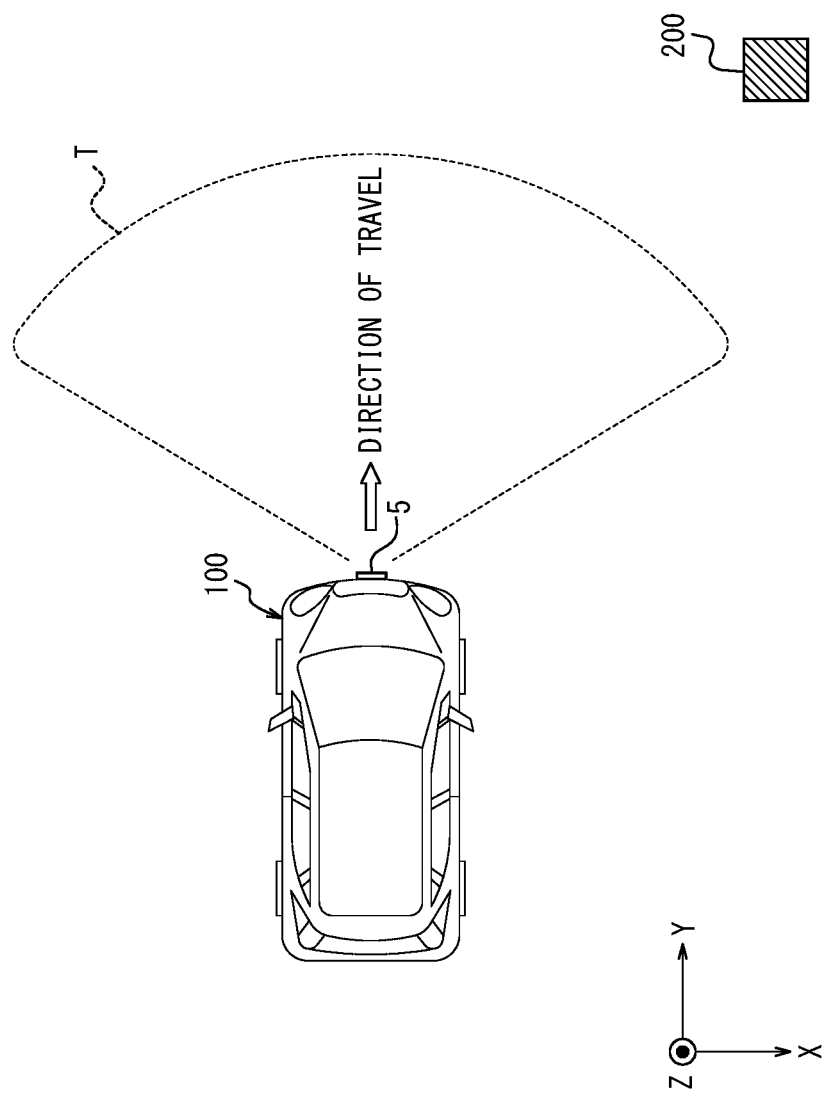
FIG. 1 is a diagram illustrating an example of transmission waves of an electronic device according to an embodiment.

A technique (beamforming) of forming a beam of transmission waves transmitted from a plurality of transmission antennas is conventionally known in technical fields such as wireless communication. With beamforming, a beam of transmission waves transmitted from a plurality of transmission antennas can be formed in a predetermined direction to, for example, extend the reaching distance of radio waves. A technique of using beamforming in the foregoing millimeter wave radar is proposed (for example, see WO 2016/167253 A1 (PTL 1)). It is desirable to use, from among various measurement techniques, a suitable technique depending on the object to be measured, the intended use, etc. It could therefore be helpful to provide an electronic device, a control method of an electronic device, and a control program of an electronic device that can accurately detect a stop space for a mobile body. According to an embodiment, it is possible to provide an electronic device, a control method of an electronic device, and a control program of an electronic device that can accurately detect a stop space for a mobile body. Embodiments will be described in detail below, with reference to the drawings.

An electronic device according to an embodiment can be used when detecting a space for parking or stopping a vehicle (mobile body) such as a car (automobile). For example, the electronic device according to the embodiment measures, by a sensor installed in a vehicle such as a car, the distance between the sensor and an object around the sensor. The sensor may transmit transmission waves such as electromagnetic waves from a transmission antenna, as detection waves. The sensor may also receive reflected waves reflected off the object from among the transmission waves, by a reception antenna. The sensor may include one or both of the transmission antenna and the reception antenna. The electronic device according to the embodiment may measure, for example, the distance between the sensor and the object, based on the transmission waves transmitted by the transmission antenna and the reflected waves received by the reception antenna.

The following will describe a structure in which the electronic device according to the embodiment is mounted in a car such as a passenger car, as a typical example. The electronic device according to the embodiment is, however, not limited to being mounted in a car. The electronic device according to the embodiment may be mounted in various mobile bodies such as a bus, a truck, a motorcycle, a bicycle, a ship, an airplane, and a drone. The electronic device according to the embodiment is not limited to being mounted in a mobile body that moves with its own power. For example, the mobile body in which the electronic device according to the embodiment is mounted may be a trailer portion towed by a tractor. The electronic device according to the embodiment can measure, for example, the distance between the sensor and the object in a situation in which at least one of the sensor and the object can move. The electronic device according to the embodiment can measure, for example, the distance between the sensor and the object even when both the sensor and the object are stationary.

An example of transmission waves transmitted by the electronic device according to the embodiment will be described below.

FIG. 1 is a diagram illustrating an example of transmission waves transmitted by the electronic device according to the embodiment. FIG. 1 illustrates an example in which a sensor including transmission antennas according to the embodiment is installed in a mobile body.

A sensor 5 including transmission antennas according to the embodiment is installed in a mobile body 100 illustrated in FIG. 1. An electronic device 1 according to the embodiment is mounted (e.g. included) in the mobile body 100 illustrated in FIG. 1. A specific structure of the electronic device 1 will be described later. The mobile body 100 illustrated in FIG. 1 may be a vehicle of a car such as a passenger car. The mobile body 100 illustrated in FIG. 1 may be any type of mobile body. In FIG. 1, for example, the mobile body 100 may move (run or slow down) in the Y-axis positive direction (direction of travel) in the drawing, move in other directions, or be stationary without moving.

As illustrated in FIG. 1, the sensor 5 including a plurality of transmission antennas is installed in the mobile body 100. In the example illustrated in FIG. 1, only one sensor 5 including the plurality of transmission antennas is installed at the front of the mobile body 100. The position at which the sensor 5 including the plurality of transmission antennas is installed in the mobile body 100 is not limited to the position illustrated in FIG. 1, and may be any other position as appropriate. For example, the sensor 5 illustrated in FIG. 1 may be installed at the left, the right, and/or the back of the mobile body 100. The number of sensors 5 may be any number greater than or equal to 1, depending on various conditions (or requirements) such as the range and/or accuracy of measurement in the mobile body 100.

The sensor 5 transmits electromagnetic waves from the transmission antennas, as transmission waves. For example, in the case where there is a certain object around the mobile body 100, at least part of the transmission waves transmitted from the sensor 5 is reflected off the object to become reflected waves. As a result of the reflected waves being received by, for example, a reception antenna of the sensor 5, the electronic device 1 mounted in the mobile body 100 can detect the object.

The sensor 5 including the transmission antennas may be typically a radar (radio detecting and ranging) sensor that transmits and receives radio waves. The sensor 5 is, however, not limited to a radar sensor. For example, the sensor 5 according to the embodiment may be a sensor based on a technique of lidar (light detection and ranging, laser imaging detection and ranging) by lightwaves. Such sensors may include, for example, patch antennas and the like. Since the techniques of radar and lidar are already known, detailed description is simplified or omitted as appropriate.

The electronic device 1 mounted in the mobile body 100 illustrated in FIG. 1 can detect a certain object present within a predetermined distance mainly in front of the mobile body 100, by transmitting transmission waves from the transmission antennas of the sensor 5. Thus, the electronic device 1 can detect the presence of the object mainly in front of the mobile body 100. The electronic device 1 can also measure the distance between the mobile body 100 as the own vehicle and the object. The electronic device 1 can further measure the azimuth angle from the mobile body 100 as the own vehicle toward the object. The electronic device 1 can further measure the relative speed of the mobile body 100 as the own vehicle and the object.

The object may be, for example, at least one of an oncoming car running in a lane adjacent to the mobile body 100, a car running parallel to the mobile body 100, and a car running ahead or behind in the same lane as the mobile body 100. The object may be any object around the mobile body 100, such as a motorcycle, a bicycle, a stroller, a pedestrian, a guardrail, a median strip, a road sign, a sidewalk step, a wall, and an obstacle. The object may be moving or stopped. For example, the object may be a car parked or stopped around the mobile body 100.

As illustrated in FIG. 1, the electronic device 1 mounted in the mobile body 100 transmits transmission waves such as radio waves from the sensor 5 including a transmission antenna. In FIG. 1, the range (beam) of reach of the transmission waves transmitted from the transmission antenna of the sensor 5 is schematically illustrated as transmission waves T. The sensor 5 may include a plurality of transmission antennas, as described later. For example, the sensor 5 can form a beam of transmission waves T illustrated in FIG. 1, by transmission waves transmitted from one of the plurality of transmission antennas. The beam width (transmission range) of the transmission waves T transmitted from the sensor 5 may be, for example, an angle of approximately 120°, as illustrated in FIG. 1. The beam width of the transmission waves T transmitted from the transmission antenna of the sensor 5 can be set based on various conditions such as the structure and/or arrangement of the transmission antenna.

Thus, the electronic device 1 according to the embodiment may transmit the transmission waves T from at least one of the plurality of transmission antennas included in the sensor 5. In this case, the transmission waves T have a relatively broad beam width with, for example, an angle of approximately 120°, as illustrated in FIG. 1. An operation mode in which transmission waves such as the transmission waves T are transmitted from at least one of the plurality of transmission antennas included in the sensor 5 installed in the mobile body 100 is hereafter also referred to as "first mode", for the sake of convenience. The first mode is also referred to as "normal mode" given that, in the first mode, normal measurement by radar (i.e. without beamforming) can be performed by transmitting transmission waves from at least one of the plurality of transmission antennas included in the sensor 5.

In the situation illustrated in FIG. 1, the beam of the transmission waves T does not reach an object 200 ahead of the mobile body 100. Accordingly, in this situation, the electronic device 1 mounted in the mobile body 100 cannot detect the presence of the object 200 based on the transmission waves T transmitted from the transmission antenna of the sensor 5. For example, suppose the mobile body 100 further moves forward from the situation illustrated in FIG. 1 and as a result the beam of the transmission waves T reaches the object 200. The electronic device 1 mounted in the mobile body 100 can then detect the presence of the object 200 based on the transmission waves T transmitted from the transmission antenna of the sensor 5.

Figure 2:
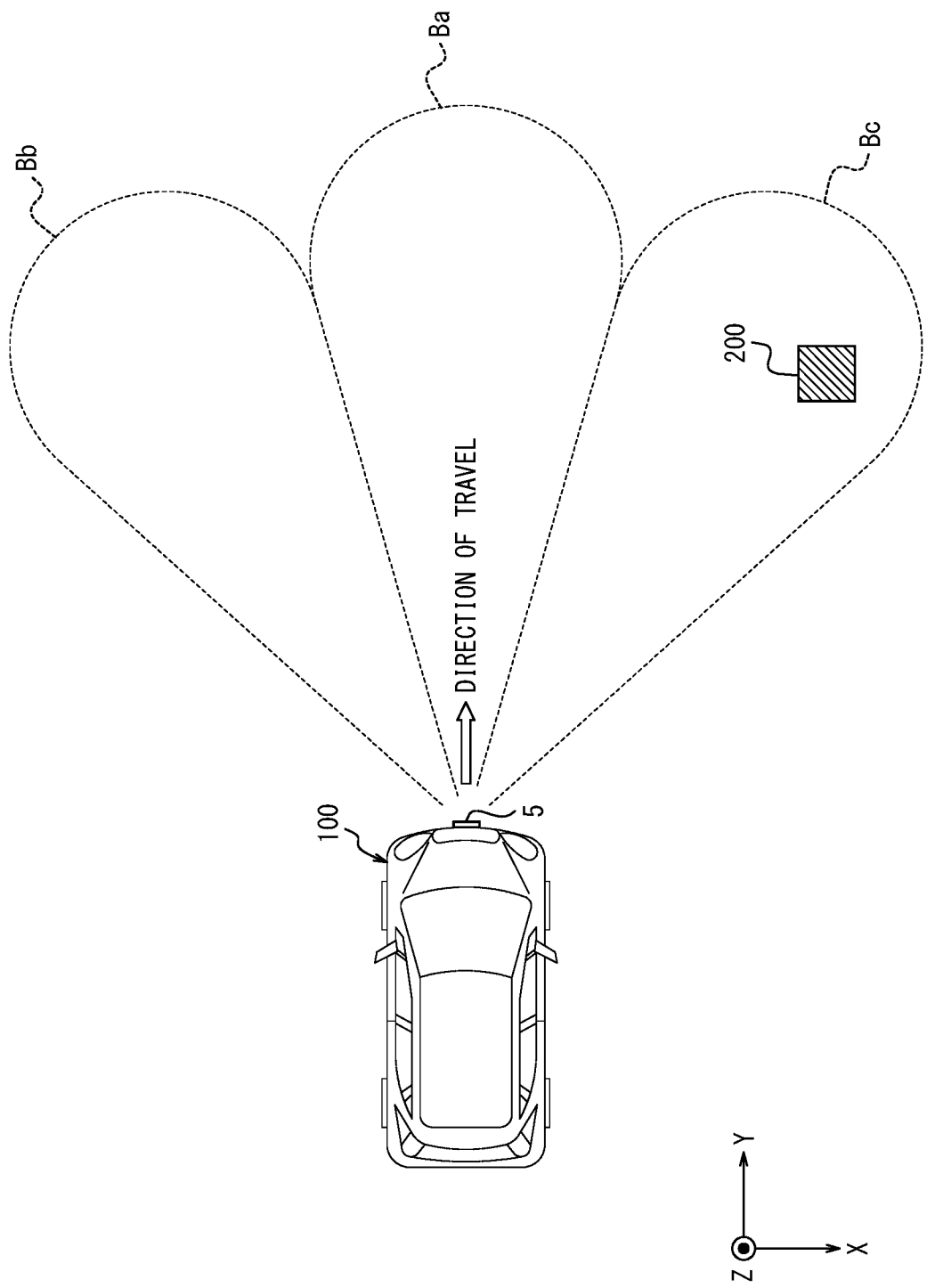
FIG. 2 is a diagram illustrating another example of transmission waves of the electronic device according to the embodiment.

FIG. 2 is a diagram illustrating another example of transmission waves transmitted by the electronic device 1 according to the embodiment.

FIG. 2 schematically illustrates a state in which the transmission waves transmitted from the plurality of transmission antennas included in the sensor 5 installed in the mobile body 100 form a radio wave beam. The sensor 5 may include a plurality of transmission antennas, as described later. Hence, the electronic device 1 according to the embodiment is capable of forming (i.e. beamforming) a beam of transmission waves T transmitted from at least two of the plurality of transmission antennas included in the sensor 5 installed in the mobile body 100. Specifically, as a result of the electronic device 1 controlling the phases of the transmission waves transmitted from at least two of the plurality of transmission antennas included in the sensor 5, the transmission waves can intensify each other in a predetermined direction.

For example, as illustrated in FIG. 2, the plurality of transmission antennas included in the sensor 5 installed at the front of the mobile body 100 can form (i.e. beamforming) a beam Ba of transmission waves in front of the mobile body 100. Here, the electronic device 1 controls the phases of the respective transmission waves transmitted from the plurality of transmission antennas included in the sensor 5 so that the transmission waves will be in phase with each other in the front direction of the mobile body 100 (Y-axis positive direction). Consequently, the plurality of transmission waves intensify each other in the front direction of the mobile body 100 (Y-axis positive direction) and form the radio wave beam Ba. As mentioned above, the use of the beamforming technique can improve, for example, the accuracy in the measurement of the distance from the object detected using the transmission waves. In particular, with beamforming, the beam width of the transmission waves is narrowed, so that the noise component contained in the reflected waves can be reduced. Moreover, with beamforming, the transmission waves in a specific direction intensify each other, so that the reaching distance of the transmission waves can be extended.

The electronic device 1 can, by appropriately controlling the phases of the transmission waves transmitted from the plurality of transmission antennas included in the sensor 5, change the direction of the beam of the transmission waves. For example, the electronic device 1 can control the phases of the respective transmission waves transmitted from the plurality of transmission antennas included in the sensor 5 so that the transmission waves will be in phase with each other in the front left direction of the mobile body 100 (leftward in the Y-axis positive direction). Consequently, the plurality of transmission waves intensify each other in the front left direction of the mobile body 100 (leftward in the Y-axis positive direction) to form a radio wave beam Bb. The electronic device 1 can also control the phases of the respective transmission waves transmitted from the plurality of transmission antennas included in the sensor 5 so that the transmission waves will be in phase with each other in the front right direction of the mobile body 100 (rightward in the Y-axis positive direction). Consequently, the plurality of transmission waves intensify each other in the front right direction of the mobile body 100 (rightward in the Y-axis positive direction) to form a radio wave beam Bc. The electronic device 1 may aim the beam of the transmission waves transmitted from the transmission antennas 40 in any of various directions other than the directions of the beams Ba, Bb, and Bc illustrated in FIG. 2, by appropriately changing the phases of the transmission waves.

As illustrated in FIG. 2, for example in the case where the object 200 is present around the mobile body 100 (front right), the electronic device 1 can control the transmission waves transmitted from the sensor 5 to form the beam Bc. By controlling the direction of the beam of the transmission waves in this way, the electronic device 1 can measure the angle (e.g. azimuth angle) from the sensor 5 toward the object 200. Hence, with beamforming, the radiation direction of the transmission waves can be controlled to improve the measurement accuracy of the angle toward the object.

Thus, the electronic device 1 according to the embodiment may form (i.e. beamforming) a beam such as the beam Ba, Bb, or Bc illustrated in FIG. 2, by transmitting transmission waves from at least two of the plurality of transmission antennas included in the sensor 5. In this case, as illustrated in FIG. 2, the beam Ba, Bb, or Bc may have a beam width narrower than the beam width of the transmission waves T illustrated in FIG. 1. For example, the beam Ba, Bb, or Bc may have an angle of approximately 30°. Moreover, as illustrated in FIG. 2, the transmission waves forming the beam Ba, Bb, or Bc may have a longer reach than the transmission waves T illustrated in FIG. 1.

An operation mode in which beamforming of transmission waves transmitted from at least two of the plurality of transmission antennas included in the sensor 5 installed in the mobile body 100 is performed is hereafter also referred to as "second mode", for the sake of convenience. The second mode is also referred to as "BF mode" given that beamforming is performed. The first mode (normal mode) can be regarded as an operation mode in which beamforming of transmission waves transmitted from the plurality of transmission antennas included in the sensor 5 installed in the mobile body 100 is not performed.

In FIGS. 1 and 2, the size of the sensor 5 is exaggerated. Accordingly, in FIGS. 1 and 2, the ratio between the size of the sensor 5 and the size of the mobile body 100 does not necessarily represent the actual ratio. In FIGS. 1 and 2, the sensor 5 is installed on the outside of the mobile body 100. However, in an embodiment, the sensor 5 may be installed at any of various locations in the mobile body 100. For example, in an embodiment, the sensor 5 may be installed inside a bumper of the mobile body 100 so as not to be seen from outside. In FIGS. 1 and 2, the transmission waves T transmitted from the sensor 5 and the beams Ba, Bb, and Bc formed by the transmission waves are schematically illustrated. That is, in FIGS. 1 and 2, the ratio between the size of the mobile body 100 and the size of each of the transmission waves T and the beams Ba, Bb, and Bc does not necessarily represent the actual ratio.

It is assumed here that each transmission antenna of the sensor 5 transmits radio waves in a frequency band such as millimeter waves (30 GHz or more) or submillimeter waves (e.g. about 20 GHz to 30 GHz), as a typical example. For example, the transmission antenna of the sensor 5 may transmit radio waves with a frequency bandwidth of 4 GHz, e.g. 77 GHz to 81 GHz. By transmitting and receiving the millimeter waves, the electronic device 1 can calculate the distance between the mobile body 100 having the sensor 5 installed therein and the object around the mobile body 100. By transmitting and receiving the millimeter waves, the electronic device 1 can also calculate the position of the object around the mobile body 100 having the sensor 5 installed therein. By transmitting and receiving the millimeter waves, the electronic device 1 can also calculate the angle toward the object around the mobile body 100 having the sensor 5 installed therein. By transmitting and receiving the millimeter waves, the electronic device 1 can also calculate the relative speed of the mobile body 100 having the sensor 5 installed therein and the object around the mobile body 100.

Figure 3:
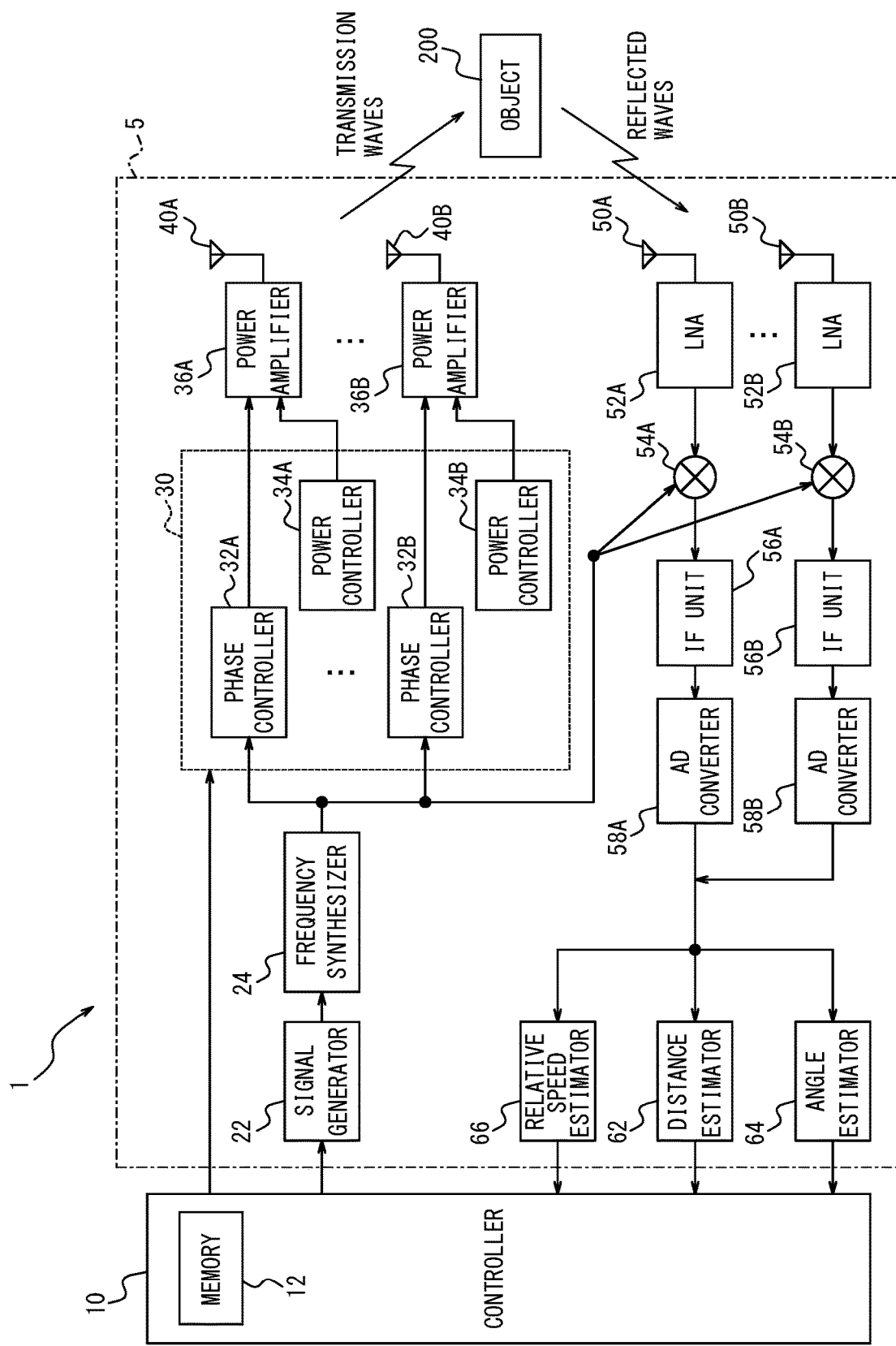
FIG. 3 is a functional block diagram schematically illustrating the structure of the electronic device according to the embodiment.

FIG. 3 is a functional block diagram schematically illustrating an example of the structure of the electronic device 1 according to the embodiment. The structure of the electronic device 1 according to the embodiment will be described below.

As illustrated in FIG. 3, the electronic device 1 according to the embodiment includes the sensor 5 and a controller 10. The electronic device 1 according to the embodiment may also include a signal generator 22, a frequency synthesizer 24, a transmission controller 30, power amplifiers 36A and 36B, and transmission antennas 40A and 40B. The sensor 5 may include at least the transmission antennas 40A and 40B. The sensor 5 may include one or more other functional parts such as the controller 10, the transmission controller 30, and the power amplifiers 36A and 36B. In the example illustrated in FIG. 3, the sensor 5 and the controller 10 are illustrated as separate functional parts. Alternatively, the sensor 5 may include part or whole of the controller 10. The members included in the sensor 5 are not limited to the example illustrated in FIG. 3, and any of the members illustrated in FIG. 3 may be not included in the sensor 5. The transmission antennas 40A and 40B, reception antennas 50A and 50B, and the power amplifiers 36A and 36B may be contained in one housing as the sensor 5.

The electronic device 1 illustrated in FIG. 3 includes two transmission antennas 40A and 40B. Hereafter, in the case where the transmission antennas 40A and 40B are not distinguished from each other in the electronic device 1 according to the embodiment, they are collectively referred to as "transmission antenna 40". The electronic device 1 illustrated in FIG. 3 may include two functional parts of any of the other types (e.g. the power amplifiers 36A and 36B). In the case where such a plurality of functional parts of the same type are not distinguished from each other, the functional parts are collectively referred to by omitting symbols such as A and B.

The electronic device 1 according to the embodiment may further include the reception antennas 50A and 50B, LNAs 52A and 52B, mixers 54A and 54B, IF units 56A and 56B, AD converters 58A and 58B, a distance estimator 62, an angle estimator 64, and a relative speed estimator 66. For these functional parts, too, in the case where a plurality of functional parts of the same type are not distinguished from each other, the functional parts are collectively referred to by omitting symbols such as A and B. The sensor 5 may include the reception antennas 50A and 50B. The sensor 5 may include other functional parts such as the LNAs 52A and 52B.

The controller 10 included in the electronic device 1 according to the embodiment controls overall operation of the electronic device 1, including control of each of the functional parts included in the electronic device 1. The controller 10 may include at least one processor such as a central processing unit (CPU), to provide control and processing capacity for achieving various functions. The controller 10 may be implemented by one processor, by several processors, or by respective separate processors. Each processor may be implemented as a single integrated circuit (IC). Each processor may be implemented as a plurality of integrated circuits and/or discrete circuits communicably connected to one another. Each processor may be implemented based on any of other various known techniques. In an embodiment, the controller 10 may be implemented, for example, by a CPU and a program executed by the CPU. As illustrated in FIG. 3, the controller 10 may include a memory 12 necessary for the operation of the controller 10. The memory 12 may store the program executed by the controller 10, results of processes performed by the controller 10, and the like. The memory 12 may function as a work memory of the controller 10.

In the electronic device 1 according to the embodiment, the controller 10 can control the transmission controller 30. In this case, the controller 10 may control the transmission controller 30 based on various information stored in the memory 12. In the electronic device 1 according to the embodiment, the controller 10 may instruct the signal generator 22 to generate a signal, or control the signal generator 22 to generate a signal.

In the case where the mobile body 100 is a car, communication between electronic control units (ECUs) can be performed using a communication interface such as CAN (Controller Area Network). In this case, the controller 10 can acquire control information of the mobile body 100 from an ECU or the like. Hence, in the electronic device 1 according to the embodiment, the controller 10 may determine a transmission wave transmission mode based on the acquired control information and the like. For example, the transmission wave transmission mode may be any of the foregoing first mode (normal mode) and second mode (BF mode). The transmission wave transmission mode may be various settings in each of the modes. For example, the transmission wave transmission mode may define the number of transmission antennas (the number antennas) that transmit transmission waves in each of the modes. For example, the transmission wave transmission mode may define whether to perform beamforming and/or the angle of beamforming. Herein, the angle of beamforming may be an angle for increasing the gain of the beam for the installation location (position) of the transmission antennas 40 in the mobile body 100 in the case of performing beamforming.

Having determined the transmission mode, the controller 10 supplies setting information in the transmission mode to the transmission controller 30. The setting information in the transmission mode may include, for example, information of the number of transmission antennas that transmit transmission waves in the transmission mode. The setting information in the transmission mode may include, for example, information of the power with which the transmission antennas transmit transmission waves in the transmission mode. The setting information in the transmission mode may include, for example, information of the phase of transmission waves transmitted from each of the plurality of transmission antennas 40 in the case of performing beamforming.

For such operation, for example, a table or the like in which each transmission mode is associated with setting information necessary for operation in the transmission mode may be stored in the memory 12 beforehand. For example, transmission wave phase information when performing beamforming in a transmission mode may be stored in the memory 12 in association with the installation location (position) and installation angle of the transmission antenna 40 in the mobile body 100. In such a case, having determined the transmission mode, the controller 10 can read setting information corresponding to the determined transmission mode from the memory 12 and supply the setting information to the transmission controller 30.

To change the reaching distance of transmission waves T transmitted from the transmission antenna 40, for example, the transmission power of the transmission waves T may be adjusted to change the gain of the transmission antenna 40 and/or the gain of beamforming. In this case, the transmission power of the transmission waves T transmitted from the transmission antenna 40 and the gain of the transmission antenna 40 and/or the gain of beamforming may be stored in the memory 12 in association with each other.

The foregoing transmission modes and the setting information corresponding to each transmission mode may be generated as appropriate based on various conditions. In such a case, having determined the transmission mode, the controller 10 can supply the setting information corresponding to the determined transmission mode to the transmission controller 30, even when the setting information is not stored in the memory 12.

The signal generator 22 generates a signal (transmission signal) transmitted from the transmission antenna 40 as the transmission waves T, based on control by the controller 10. When generating the transmission signal, for example, the signal generator 22 assigns the frequency of the transmission signal based on control by the controller 10. For example, the signal generator 22 receives frequency information from the controller 10, and generates a signal of a predetermined frequency in a frequency band of 77 GHz to 81 GHz. The signal generator 22 may include a functional part such as a voltage controlled oscillator (VCO).

The signal generator 22 may be configured as hardware having the function, configured as a microcomputer or the like, or configured as a processor such as a CPU and a program executed by the processor. Each functional part described below may be configured as hardware having the function, or, if possible, configured as a microcomputer or the like or configured as a processor such as a CPU and a program executed by the processor.

In the electronic device 1 according to the embodiment, the signal generator 22 may generate a transmission signal such as a chirp signal. In particular, the signal generator 22 may generate a signal (linear chirp signal) whose frequency linearly changes periodically. For example, the signal generator 22 may generate a chirp signal whose frequency linearly increases periodically from 77 GHz to 81 GHz with time. For example, the signal generator 22 may generate a signal whose frequency periodically repeats a linear increase (up-chirp) and decrease (down-chirp) from 77 GHz to 81 GHz with time. The signal generated by the signal generator 22 may be, for example, set by the controller 10 beforehand. The signal generated by the signal generator 22 may be, for example, stored in the memory 12 beforehand. Since chirp signals used in technical fields such as radar are already known, more detailed description is simplified or omitted as appropriate. The signal generated by the signal generator 22 is supplied to the frequency synthesizer 24.

The frequency synthesizer 24 increases the frequency of the signal generated by the signal generator 22 to a frequency in a predetermined frequency band. The frequency synthesizer 24 may increase the frequency of the signal generated by the signal generator 22 to a frequency selected as the frequency of the transmission waves T transmitted from the transmission antenna 40. The frequency selected as the frequency of the transmission waves T transmitted from the transmission antenna 40 may be, for example, set by the controller 10. The frequency selected as the frequency of the transmission waves T transmitted from the transmission antenna 40 may be, for example, stored in the memory 12. The signal increased in frequency by the frequency synthesizer 24 is supplied to the transmission controller 30 and each mixer 54.

The transmission controller 30 performs control to transmit the transmission signal supplied from the frequency synthesizer 24 as the transmission waves T from at least one of the plurality of transmission antennas 40. As illustrated in FIG. 3, the transmission controller 30 may include phase controllers 32 and power controllers 34. As illustrated in FIG. 3, the transmission controller 30 may perform control to transmit the transmission signal from the transmission antenna 40 as the transmission waves T, based on control by the controller 10. Various information necessary for the controller 10 to control the transmission controller 30 may be stored in the memory 12.

Each phase controller 32 controls the phase of the transmission signal supplied from the frequency synthesizer 24. Specifically, the phase controller 32 may adjust the phase of the signal supplied from the frequency synthesizer 24 by advancing or delaying the phase of the signal as appropriate, based on control by the controller 10. In this case, based on the path difference between the respective transmission waves T transmitted from the plurality of transmission antennas 40, the phase controllers 32 may adjust the phases of the respective transmission signals. As a result of the phase controllers 32 adjusting the phases of the respective transmission signals as appropriate, the transmission waves T transmitted from the plurality of transmission antennas 40 intensify each other and form a beam in a predetermined direction (i.e. beamforming).

For example, in the case of transmitting the transmission waves T without beamforming in the first mode, the phase controller 32 does not need to control the phase of the transmission signal transmitted as the transmission waves T from the transmission antenna 40. For example, in the case of performing beamforming of the transmission waves T in the second mode, the phase controller 32 may control the phase of a corresponding one of the plurality of transmission signals transmitted from the plurality of transmission antennas 40 as the transmission waves T, depending on the beamforming direction. In this case, the correlation between the beamforming direction and the amount of phase to be controlled in the transmission signal transmitted from each of the plurality of transmission antennas 40 may be stored in, for example, the memory 12. The signal phase-controlled by the phase controller 32 is supplied to the corresponding power amplifier 36.

Each power controller 34 is connected to the corresponding power amplifier 36. The power controller 34 controls the amplification of power by the power amplifier 36 connected to the power controller 34. By controlling the power amplifier 36, the power controller 34 controls the transmission power of the transmission waves T transmitted from the transmission antenna 40 connected to the power amplifier 36. For example, the power controller 34 can switch on and off the transmission power of the power amplifier 36 connected to the power controller 34. That is, the power controller 34 can switch whether to transmit the transmission waves T from the transmission antenna 40 connected to the power amplifier 36.

For example, the power controller 34A can switch on and off the transmission power of the transmission waves T transmitted from the transmission antenna 40A. The power controller 34B can switch on and off the transmission power of the transmission waves T transmitted from the transmission antenna 40B. Thus, the electronic device 1 can freely control whether to transmit the transmission waves T from the transmission antenna 40A and/or the transmission antenna 40B, based on control by both of the power controllers 34A and 34B. The power controller 34 may adjust the transmission power of the power amplifier 36 connected to the power controller 34, as appropriate. Thus, the power controller 34 can define the number of transmission antennas 40 from which the transmission waves T are transmitted from among the plurality of transmission antennas 40, for example based on the setting in the transmission mode. Various information necessary for control by the power controller 34 may be, for example, stored in the memory 12. For example, the memory 12 may store the correlation between the control by each power controller 34 and the transmission power of the transmission waves T transmitted from the corresponding transmission antenna 40. The memory 12 may store such correlation for each transmission mode.

The electronic device 1 according to the embodiment can set various transmission conditions of the transmission waves T transmitted from at least one of the plurality of transmission antennas 40, based on control by the phase controllers 32 and/or the power controllers 34 in the transmission controller 30. Specifically, the electronic device 1 according to the embodiment can set whether to perform beamforming, the beam direction in the case of performing beamforming, etc. In this case, for example, the memory 12 may store control information of the phase controllers 32 and/or the power controllers 34 corresponding to various transmission conditions of the transmission waves T. By reading the control information corresponding to the transmission conditions of the transmission waves T from the memory 12, the controller 10 enables the control of the transmission waves T by the phase controllers 32 and/or the power controllers 34. For example, in the case where the electronic device 1 operates in the normal mode (first mode) (e.g. not performing beamforming), each power controller 34 controls the power when transmitting the transmission waves T depending on the antenna radiation gain of the corresponding transmission antenna 40. For example, in the case where the electronic device 1 operates in the BF mode (second mode) (e.g. performing beamforming), each phase controller 32 appropriately changes the phase of the transmission signal transmitted from the transmission antenna used from among the plurality of transmission antennas 40. In an embodiment, when performing beamforming for the transmission waves T transmitted from a plurality of transmission antennas 40, the number of beams, the beam shape, etc. can be variously set based on control by the phase controllers 32 and the power controllers 34.

Each power amplifier 36 amplifies the power of the transmission signal supplied from the phase controller 32, based on control by the power controller 34. Since techniques of amplifying power of transmission signals are already known, more detailed description is omitted. The power amplifier 36 is connected to the transmission antenna 40.

Each transmission antenna 40 outputs (transmits) the transmission signal amplified by the power amplifier 36, as the transmission waves T. The sensor 5 may include a plurality of transmission antennas such as the transmission antennas 40A and 40B, as mentioned above. Since each transmission antenna 40 can be configured in the same way as transmission antennas used in known radar techniques, more detailed description is omitted.

Thus, the electronic device 1 according to the embodiment can transmit the transmission signal such as a chirp signal from the plurality of transmission antennas 40 as the transmission waves T. At least one of the functional parts included in the electronic device 1 may be contained in one housing having a structure that cannot be opened easily. For example, the transmission antennas 40A and 40B, the reception antennas 50A and 50B, and the power amplifiers 36A and 36B may be contained in one housing having a structure that cannot be opened easily. In the case where the sensor 5 is installed in the mobile body 100 such as a car, each transmission antenna 40 may transmit transmission waves T to outside the mobile body 100 through a member such as a radar cover. In this case, the radar cover may be made of a material that allows electromagnetic waves to pass through, such as synthetic resin or rubber. For example, the radar cover may be a housing of the sensor 5. By covering the transmission antennas 40 with a member such as a radar cover, the risk that the transmission antennas 40 break or become defective due to external contact can be reduced. The radar cover and the housing are also referred to as "radome" (the same applies hereafter).

The electronic device 1 illustrated in FIG. 3 includes two transmission antennas 40, e.g. the transmission antennas 40A and 40B, and transmits the transmission waves T by the two transmission antennas 40. Hence, the electronic device 1 illustrated in FIG. 3 includes two functional parts of the same type necessary for transmitting the transmission waves T from the two transmission antennas 40, for each type of functional part. Specifically, the transmission controller 30 includes two phase controllers 32, e.g. the phase controllers 32A and 32B. The transmission controller 30 also includes two power controllers 34, e.g. the power controllers 34A and 34B. The electronic device 1 illustrated in FIG. 3 also includes two power amplifiers 36, e.g. the power amplifiers 36A and 36B.

Although the electronic device 1 illustrated in FIG. 3 includes two transmission antennas 40, the number of transmission antennas 40 included in the electronic device 1 according to the embodiment may be any number greater than or equal to 2, e.g. three or more transmission antennas 40. In this case, the electronic device 1 according to the embodiment may include the same number of power amplifiers 36 as the plurality of transmission antennas 40. The electronic device 1 according to the embodiment may also include the same number of phase controllers 32 and the same number of power controllers 34 as the plurality of transmission antennas 40.

Each reception antenna 50 receives reflected waves R. The reflected waves R result from reflection of the transmission waves T off the object 200. The reception antennas 50 may include a plurality of antennas such as the reception antennas 50A and 50B. Since each reception antenna 50 can be configured in the same way as reception antennas used in known radar techniques, more detailed description is omitted. The reception antenna 50 is connected to the LNA 52. A reception signal based on the reflected waves R received by the reception antenna 50 is supplied to the corresponding LNA 52.

The electronic device 1 according to the embodiment can receive the reflected waves R as a result of the transmission waves T transmitted as the transmission signal such as a chirp signal being reflected off the object 200, by the plurality of reception antennas 50. At least one of the functional parts included in the electronic device 1, such as the plurality of reception antennas 50, may be contained in one housing having a structure that cannot be opened easily. In the case where the sensor 5 is installed in the mobile body 100 such as a car, each reception antenna 50 may receive the reflected waves R from outside the mobile body 100 through a member such as a radar cover. In this case, the radar cover may be made of a material that allows electromagnetic waves to pass through, such as synthetic resin or rubber. For example, the radar cover may be a housing of the sensor 5. By covering the reception antennas 50 with a member such as a radar cover, the risk that the reception antennas 50 break or become defective due to external contact can be reduced.

The sensor 5 may include, for example, all transmission antennas 40 and all reception antennas 50. In the case where a reception antenna 50 is installed near a transmission antenna 40, these antennas may be included in one sensor 5 in combination. For example, one sensor 5 may include at least one transmission antenna 40 and at least one reception antenna 50. For example, one sensor 5 may include a plurality of transmission antennas 40 and a plurality of reception antennas 50. In such a case, for example, one radar sensor may be covered with one member such as a radar cover.

Each LNA 52 amplifies a reception signal based on the reflected waves R received by the reception antenna 50, with low noise. The LNA 52 may be a low-noise amplifier, and amplifies the reception signal supplied from the reception antenna 50 with low noise. The reception signal amplified by the LNA 52 is supplied to the corresponding mixer 54.

Each mixer 54 mixes (multiplies) the reception signal of RF frequency supplied from the LNA 52 and the transmission signal supplied from the frequency synthesizer 24, to generate a beat signal. The beat signal generated by the mixer 54 is supplied to the corresponding IF unit 56.

Each IF unit 56 performs frequency conversion on the beat signal supplied from the mixer 54, to lower the frequency of the beat signal to intermediate frequency (IF). The beat signal lowered in frequency by the IF unit 56 is supplied to the corresponding AD converter 58.

Each AD converter 58 digitizes the analog beat signal supplied from the IF unit 56. The AD converter 58 may include any analog-to-digital converter (ADC). The beat signal digitized by the AD converter 58 is supplied to the distance estimator 62 in the case where the number of reception antennas 50 is one, and supplied to the distance estimator 62 and the angle estimator 64 in the case where the number of reception antennas 50 is two or more.

The distance estimator 62 estimates the distance between the mobile body 100 having the electronic device 1 mounted therein and the object 200, based on the beat signal supplied from the AD converter 58. The distance estimator 62 may include, for example, a FFT processor. The FFT processor may be composed of any circuit, chip, or the like for performing fast Fourier transform (FFT) processing. The FFT processor performs FFT processing on the beat signal digitized by the AD converter 58. For example, the distance estimator 62 may perform FFT processing on the complex signal supplied from the AD converter 58. In the case where the peak of the result obtained by the FFT processing is greater than or equal to a predetermined threshold, the distance estimator 62 may determine that the object 200 is present at distance corresponding to the peak. Information of the distance estimated by the distance estimator 62 may be, for example, supplied to the controller 10.

The angle estimator 64 estimates the direction from the mobile body 100 having the electronic device 1 mounted therein toward the object 200 (i.e. the direction in which the reflected waves R reach the reception antenna 50), based on the beat signal supplied from the AD converter 58. The angle estimator 64 may include, for example, a FFT processor, as with the distance estimator 62. As mentioned above, the distance estimator 62 may perform FFT processing on the complex signal supplied from the AD converter 58, and, in the case where the peak of the result obtained by the FFT processing is greater than or equal to the predetermined threshold, determine that the object 200 is present at distance corresponding to the peak. In this case, the angle estimator 64 may estimate the direction in which the reflected waves R reach the reception antenna 50 (i.e. the direction from the object 200 toward the reception antenna 50), based on the result of receiving the reflected waves R from the object 200 by the plurality of reception antennas 50. Information of the direction (the direction of arrival or the angle of arrival) estimated by the angle estimator 64 may be, for example, supplied to the controller 10.

The relative speed estimator 66 estimates the relative speed of the object 200 and the mobile body 100, based on the beat signal.

Typically, a frequency spectrum can be obtained by performing FFT processing on the beat signal. From such a frequency spectrum, the FFT processor can estimate whether the object 200 is present within the range of the beam of the transmission waves T transmitted from the transmission antenna 40. That is, the FFT processor can estimate whether the object 200 is present within the range of the beam emitted from the sensor 5 including the transmission antenna 40, based on the FFT-processed beat signal. In the case where the object 200 is present, the FFT processor can estimate the distance between the sensor 5 including the transmission antenna 40 and the object 200, based on the FFT-processed beat signal. Further, in the case where the object 200 is present, the FFT processor can estimate the positional relationship between the sensor 5 including the transmission antenna 40 and the object 200, based on the FFT-processed beat signal.

Thus, the electronic device 1 according to the embodiment may measure (estimate) the distance between the object 200 and the mobile body 100, based on the beat signal obtained from the signal transmitted as the transmission waves T and the signal received as the reflected waves R. The electronic device 1 according to the embodiment may also measure (estimate) the positional relationship between the object 200 and the mobile body 100 (e.g. the angle of arrival at which the reflected waves R reach the mobile body 100 from the object 200), based on the beat signal. The electronic device 1 according to the embodiment may further measure (estimate) the relative speed of the object 200 and the mobile body 100, based on the beat signal. The controller 10 may perform various computation, estimation, control, and the like, using the information of the distance supplied from the distance estimator 62, the information of the direction (angle) supplied from the angle estimator 64, and the like. Since the technique of estimating the distance, direction, etc. to a certain object from which reflected waves are reflected based on a beat signal acquired using millimeter wave radar of 79 GHz band or the like is known, more detailed description is omitted.

The electronic device 1 illustrated in FIG. 3 includes two reception antennas 50, e.g. the reception antennas 50A and 50B, and receives the reflected waves R by the two reception antennas 50. Hence, the electronic device 1 illustrated in FIG. 3 includes two functional parts of the same type necessary for receiving the reflected waves R by the two reception antennas 50. Specifically, the transmission controller 30 includes two LNAs 52, two mixers 54, two IF units 56, and two AD converters 58.

Although the electronic device 1 illustrated in FIG. 3 includes two reception antennas 50, the number of reception antennas 50 included in the electronic device 1 according to the embodiment may be any number greater than or equal to 2. In this case, the electronic device 1 according to the embodiment may include the same number of LNAs 52, the same number of mixers 54, the same number of IF units 56, and the same number of AD converters 58 as the plurality of reception antennas 50.

Transmission waves transmitted by the electronic device 1 according to the embodiment will be described below.

When measuring distance or the like by millimeter-wave radar, frequency-modulated continuous wave radar (hereafter, "FMCW radar") is often used. FMCW radar sweeps the frequency of transmitted radio waves to generate a transmission signal. Therefore, for example, in millimeter-wave FMCW radar using radio waves in a frequency band of 79 GHz, the radio waves used have a frequency bandwidth of 4 GHz, e.g. 77 GHz to 81 GHz. Radar of 79 GHz in frequency band has a feature that its usable frequency bandwidth is broader than that of millimeter wave/submillimeter wave radar of 24 GHz, 60 GHz, 76 GHz, etc. in frequency band.

As described above, as a result of forming a beam of radio waves transmitted from a plurality of transmission antennas 40 (i.e. beamforming), transmission waves in a predetermined direction can intensify each other. In this way, the electronic device 1 can improve the accuracy in measuring the distance between the mobile body 100 having the electronic device 1 mounted therein and the object 200, the direction to the object 200, and the like. Hence, the electronic device 1 according to the embodiment uses, as transmission waves, radio waves that change in frequency with time as in FMCW radar, and performs beamforming for such transmission waves when necessary. This embodiment will be described in more detail below.

Figure 4:
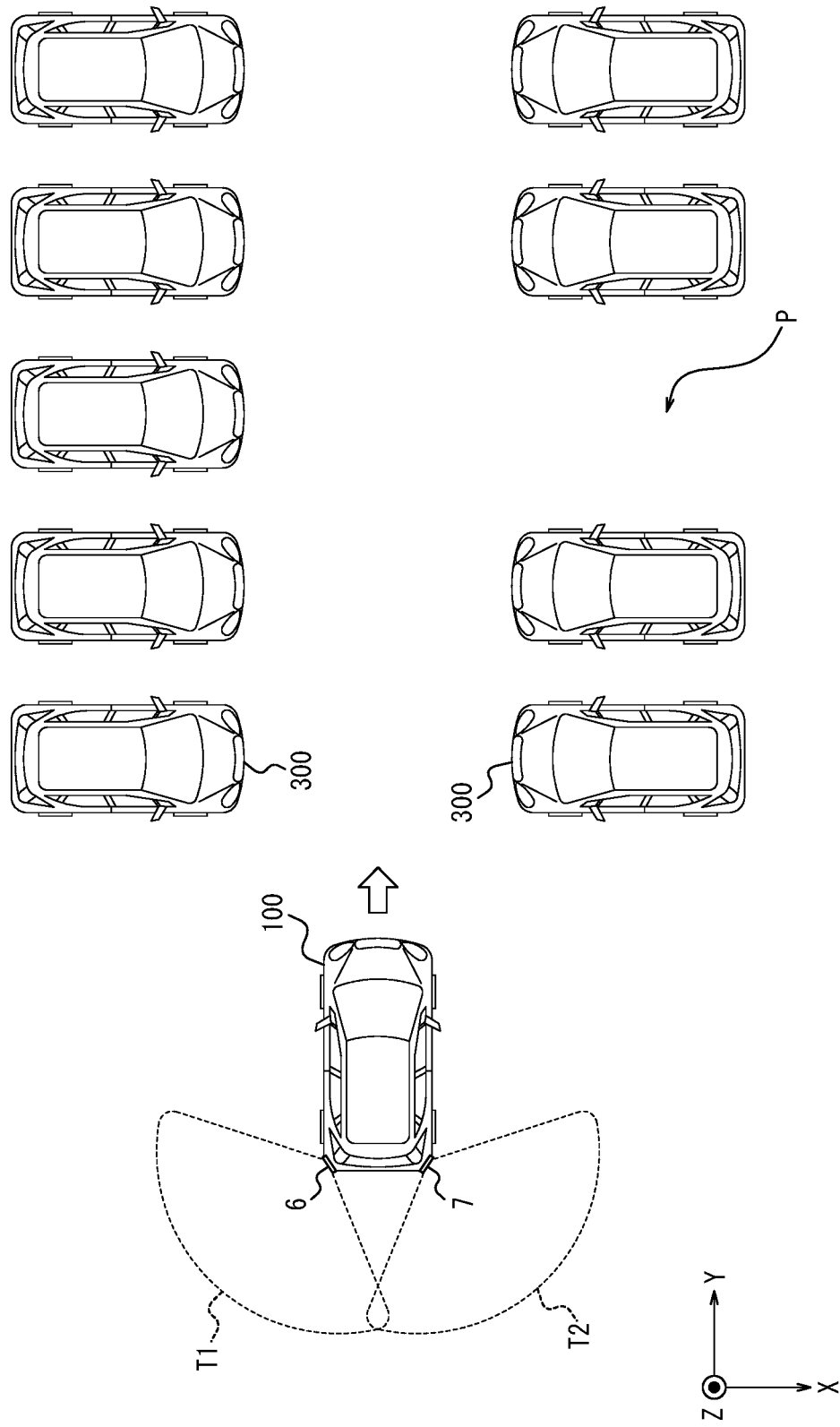
FIG. 4 is a diagram illustrating an example of operation of the electronic device according to the embodiment.
Figure 5:
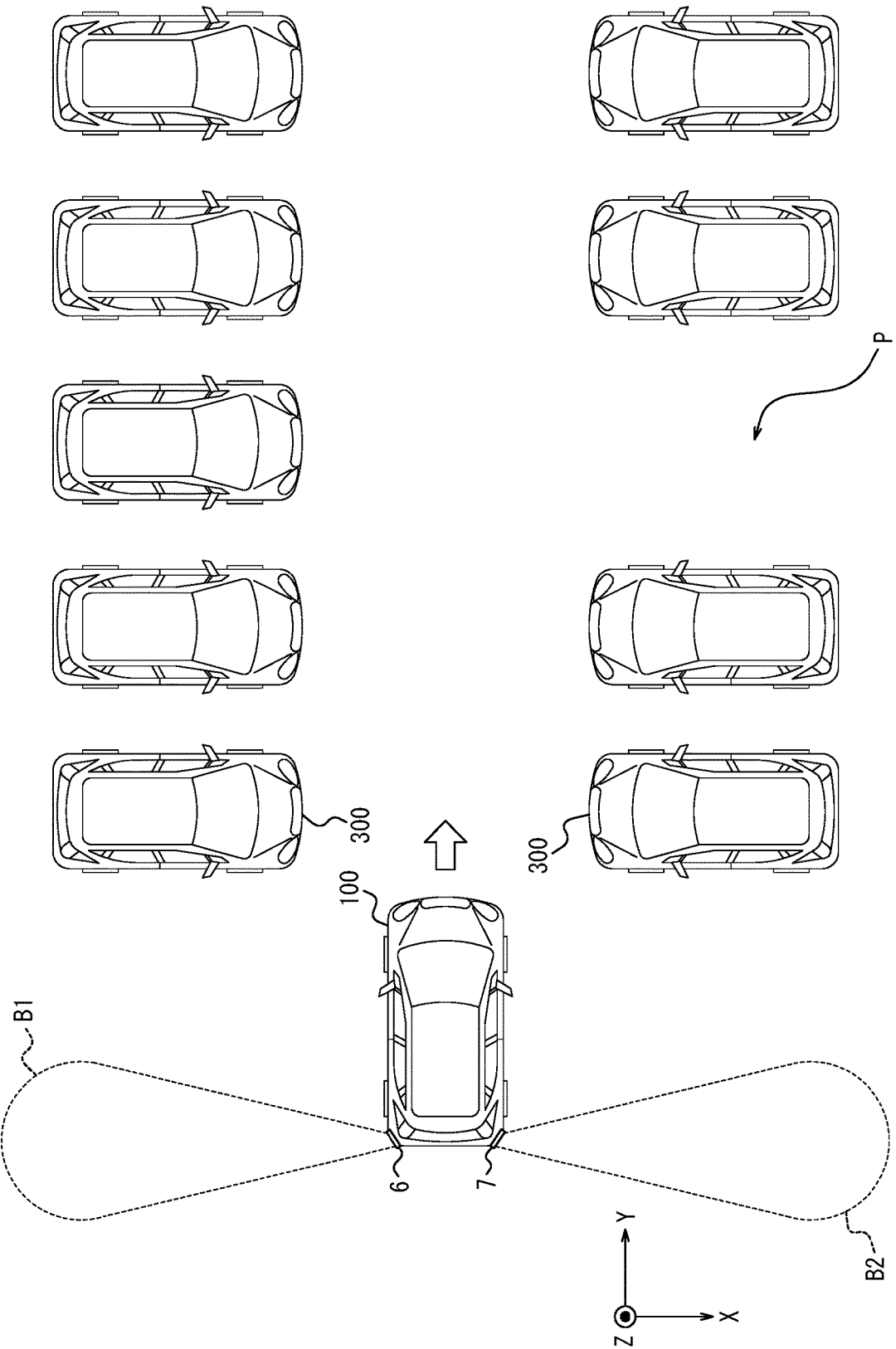
FIG. 5 is a diagram illustrating an example of operation of the electronic device according to the embodiment.
Figure 6:
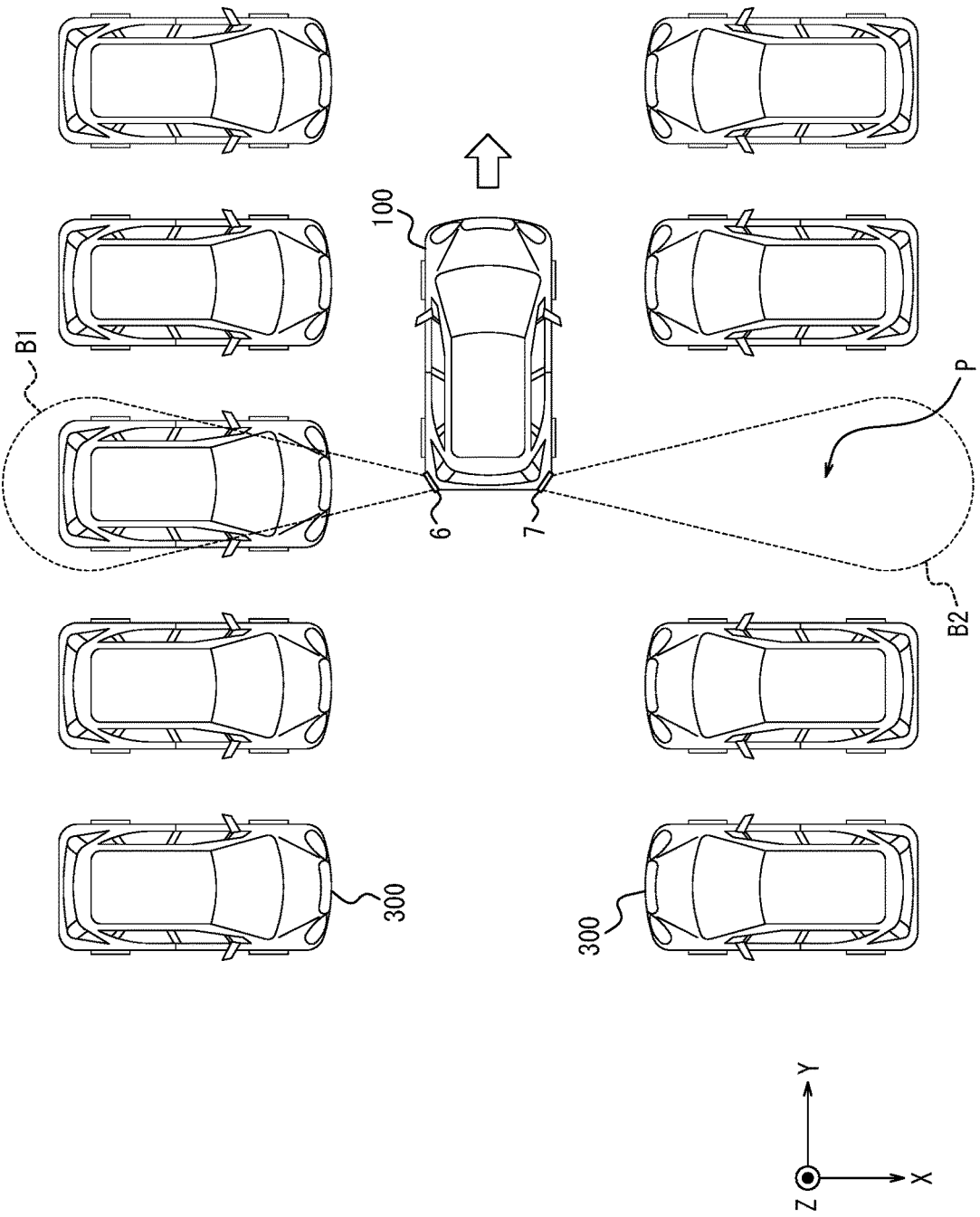
FIG. 6 is a diagram illustrating an example of operation of the electronic device according to the embodiment.

FIGS. 4 to 6 are each a diagram illustrating an example of operation of the electronic device 1 according to the embodiment.

The mobile body 100 illustrated in FIG. 4 has the electronic device 1 according to the embodiment mounted therein. An example in which the electronic device 1 mounted in the mobile body 100 performs an operation of detecting a space (stop space) where the mobile body 100 can be stopped or parked will be described below. In FIG. 4, vehicles other than the mobile body 100 are all regarded as other mobile bodies 300. The other mobile bodies 300 illustrated in FIG. 4 may all be stationary as they are stopped or parked. Alternatively, at least one of the other mobile bodies 300 may be moving as it slows down at low speed. As illustrated in FIG. 4, the electronic device 1 mounted in the mobile body 100 detects a space (stop space P) where the mobile body 100 can be stopped, in a location where the other mobile bodies 300 and like are stopped or parked.

As illustrated in FIG. 4, sensors 6 and 7 are installed in the mobile body 100. The sensor 6 is installed on the back left side with respect to the direction of travel of the mobile body 100, and the sensor 7 is installed on the back right side with respect to the direction of travel of the mobile body 100, as illustrated in FIG. 4. The sensors 6 and 7 may each be the same as the sensor 5 including a plurality of transmission antennas 40 in the electronic device 1 illustrated in FIG. 3. That is, the sensors 6 and 7 may each include a plurality of transmission antennas 40. In the mobile body 100, for example, one or more other sensors (not illustrated in FIG. 4) including a plurality of transmission antennas may be installed besides the sensors 6 and 7. The sensors 6 and 7 may each be connected to the controller 10 in the electronic device 1 illustrated in FIG. 3.

In the situation illustrated in FIG. 4, the mobile body 100 is about to start the detection of a stop space for the mobile body 100. For example, the electronic device 1 may determine that the detection of a stop space for the mobile body 100 has started, triggered by the driver of the mobile body 100 pressing a switch such as "stop space detection button". The electronic device 1 may determine that the detection of a stop space for the mobile body 100 has started, triggered by the mobile body 100 approaching a garage at home or in a predetermined location (e.g. a favorite store) based on position information by GPS or the like. The electronic device 1 may determine that the detection of a stop space for the mobile body 100 has started, based on any other trigger.

At the time when the detection of a stop space for the mobile body 100 has not started as illustrated in FIG. 4, the controller 10 in the electronic device 1 according to the embodiment may perform control to operate in the first mode (e.g. normal mode). In this case, the controller 10 may transmit transmission waves T from at least one of the plurality of transmission antennas 40 included in the sensor 6 installed in the mobile body 100. The controller 10 may also transmit transmission waves T from at least one of the plurality of transmission antennas 40 included in the sensor 7 installed in the mobile body 100.

FIG. 4 schematically illustrates a state in which transmission waves T1 are transmitted from the plurality of transmission antennas 40 included in the sensor 6 based on control by the controller 10 in the electronic device 1. FIG. 4 also schematically illustrates a state in which transmission waves T2 are transmitted from the transmission antennas 40 included in the sensor 7 based on control by the controller 10 in the electronic device 1. As illustrated in FIG. 4, the transmission waves T1 and T2 respectively transmitted from the sensors 6 and 7 may be used to detect, for example, any obstacle behind with respect to the direction of travel of the mobile body 100 in normal time. As illustrated in FIG. 4, the transmission waves T1 and T2 respectively transmitted from the sensors 6 and 7 may be each not subjected to beamforming. The transmission waves T1 and T2 respectively transmitted from the sensors 6 and 7 each have a relatively broad beam width but a relatively short transmission wave reaching distance, as illustrated in FIG. 4.

In the situation illustrated in FIG. 4, once the detection of a stop space for the mobile body 100 has started, the electronic device 1 operates as illustrated in FIG. 5.

Once the detection of a stop space for the mobile body 100 has started, the controller 10 in the electronic device 1 may perform control to operate in the second mode (e.g. BF mode), as illustrated in FIG. 5. In this case, the controller 10 may perform beamforming of transmission waves T transmitted from at least two of the plurality of transmission antennas 40 included in the sensor 6 installed in the mobile body 100. The controller 10 may also perform beamforming of transmission waves T transmitted from at least two of the plurality of transmission antennas 40 included in the sensor 7 installed in the mobile body 100.

FIG. 5 schematically illustrates a state in which a beam B1 of transmission waves T transmitted from the plurality of transmission antennas 40 included in the sensor 6 is formed based on control by the controller 10 in the electronic device 1. FIG. 5 also schematically illustrates a state in which a beam B2 of transmission waves T transmitted from the plurality of transmission antennas 40 included in the sensor 7 is formed based on control by the controller 10 in the electronic device 1. As illustrated in FIG. 5, the beams B1 and B2 of transmission waves T respectively transmitted from the sensors 6 and 7 may be each used to detect a space where the mobile body 100 can be stopped on a side of the mobile body 100, in stop space detection. The beams B1 and B2 of transmission waves T respectively transmitted from the sensors 6 and 7 each have a relatively narrow beam width but a relatively long beam reaching distance, as illustrated in FIG. 5. Therefore, in the operation of the second mode (BF mode) illustrated in FIG. 5, a stop space for the mobile body 100 can be accurately detected.

Once the detection of a stop space has started, the mobile body 100 may be driven slowly in the arrow direction illustrated in FIG. 5, for example by automated driving. In this case, the electronic device 1 can scan for a stop space on the right and left sides of the mobile body 100 with the movement of the mobile body 100. The mobile body 100 may be driven slowly in the arrow direction illustrated in FIG. 5, not by automated driving but by the driver.

For example, suppose the detection of a stop space has started and the mobile body 100 has started being driven slowly by automated driving between the lines of the other mobile bodies 300 in the direction of travel (front direction) indicated by the arrow in FIG. 5. Immediately after the mobile body 100 starts being driven slowly between the lines of the other mobile bodies 300, the electronic device 1 can recognize that there is no space where the mobile body 100 can be stopped at this point, based on the beams B1 and B2 of transmission waves T.

Suppose subsequently the mobile body 100 has moved forward between the lines of the other mobile bodies 300 in the direction of travel indicated by the arrow in FIG. 5 and reached the position illustrated in FIG. 6.

In the situation illustrated in FIG. 6, the electronic device 1 can recognize that there is no space to the left of the mobile body 100 where the mobile body 100 can be stopped at this point, based on the beam B1 of transmission waves T. Moreover, in the situation illustrated in FIG. 6, the electronic device 1 can recognize that there is a space (stop space P) to the right of the mobile body 100 where the mobile body 100 can be stopped, based on the beam B2 of transmission waves T. The electronic device 1 may detect the presence of the space (stop space P) to the right of the mobile body 100 where the mobile body 100 can be stopped, when the beam B2 of transmission waves T has passed the stop space P.

For example, in the case where a plurality of stop spaces P are detected, the electronic device 1 may cause the driver or the like to select a stop space P for stopping the mobile body 100. For example, in the case where a plurality of stop spaces P are detected, the electronic device 1 may select a stop space P for stopping the mobile body 100 based on a predetermined algorithm. The electronic device 1 may, for example, select a stop space nearest the current position from among the detected plurality of stop spaces P. The electronic device 1 may, for example, select a stop space nearest an exit from among the detected plurality of stop spaces P. The electronic device 1 may, for example, select a stop space estimated to be easiest to leave.

Upon detecting the space (stop space P) where the mobile body 100 can be stopped as illustrated in FIG. 6, the electronic device 1 may move the mobile body 100 to the stop space P by automated driving as an example. Alternatively, upon detecting the stop space P, the electronic device 1 may assist the driver's operation when driving the mobile body 100 to the stop space P. Moreover, upon detecting the stop space P, the electronic device 1 may notify the driver of the mobile body 100 or the like of the detection of the stop space P (for example, together with image information of the position of the stop space P, etc.).

After the stop space P is detected, the controller 10 may switch the operation mode of the electronic device 1 from the second mode (BF mode) to the first mode (normal mode). That is, the electronic device 1 may switch from the operation mode of forming the beams B1 and B2 as illustrated in FIGS. 5 and 6 to the operation mode of transmitting the transmission waves T1 and T2 as illustrated in FIG. 4. By switching the operation mode to the first mode, the electronic device 1 can detect, for example, any obstacle when driving the mobile body 100 backward to the detected stop space P.

Figure 7:
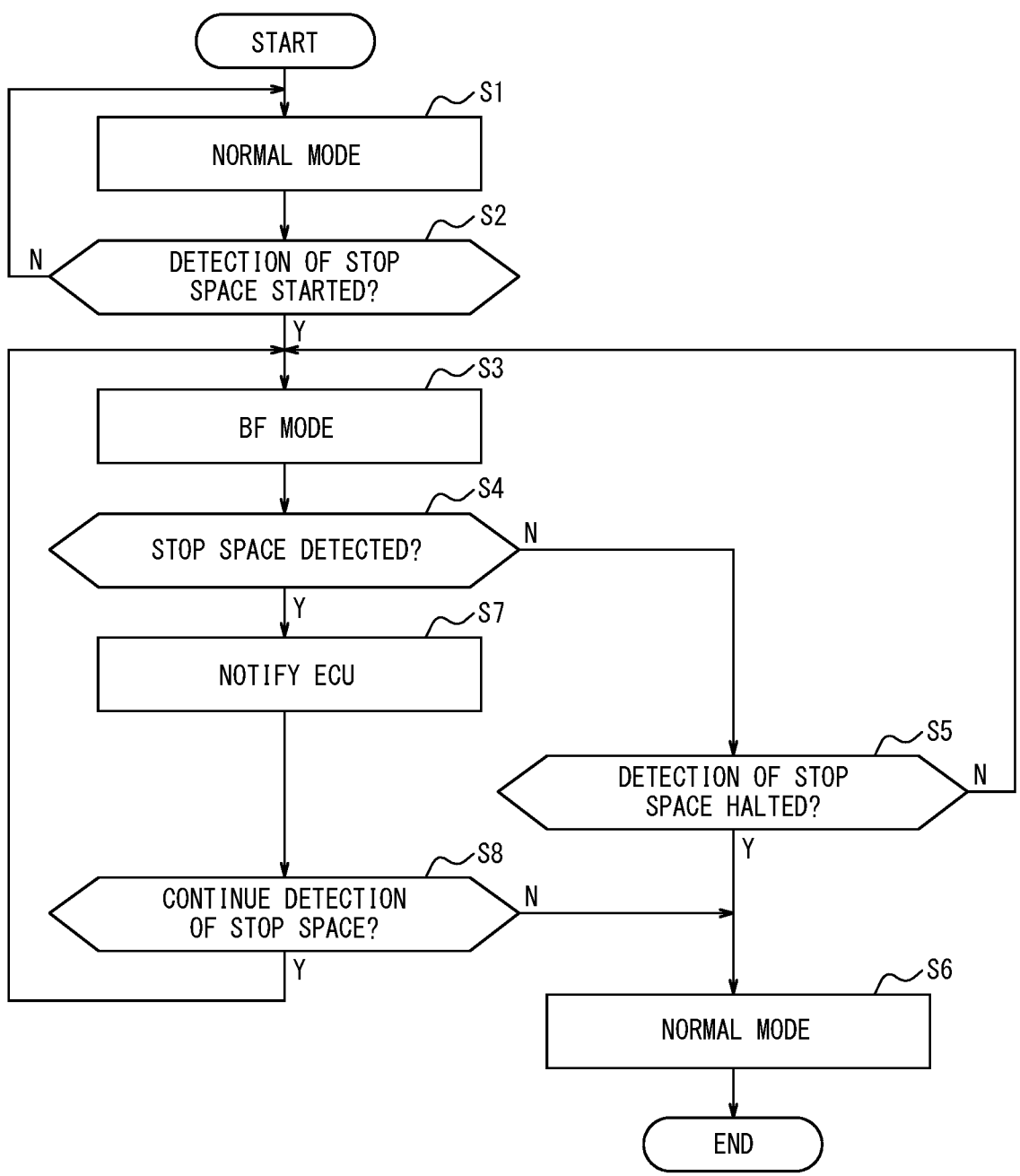
FIG. 7 is a flowchart illustrating an example of operation of the electronic device according to the embodiment.

FIG. 7 is a flowchart illustrating the operation of the electronic device 1 according to the embodiment. The operation illustrated in FIG. 7 may start, for example, when the electronic device 1 is about to start the detection of a stop space for the mobile body 100. In other words, the time at which the operation illustrated in FIG. 7 starts may correspond to the situation illustrated in FIG. 4.

Upon the start of the operation illustrated in FIG. 7, the controller 10 in the electronic device 1 operates in the normal mode (first mode) (step S1). The time at which the operation in step S1 is performed corresponds to the situation illustrated in FIG. 4 as an example.

Having started the operation in the normal mode in step S1, the controller 10 determines whether the detection of a stop space is started (step S2). In step S2, whether the detection of a stop space is started may be determined based on whether a switch such as "stop space detection button" is turned on. In step S2, whether the detection of a stop space is started may be determined based on, for example, position information by GPS.

In the case where the detection of a stop space is not started in step S2, the controller 10 returns to step S1 and continues the operation in the normal mode.

In the case where the detection of a stop space is started in step S2, the controller 10 operates in the BF mode (second mode) (step S3). The time at which the operation in step S3 is performed corresponds to the situation illustrated in FIG. 5 as an example.

Having started the operation in the BF mode in step S3, the controller 10 determines whether a stop space P for the mobile body 100 is detected (step S4). The time at which a stop space P for the mobile body 100 is detected in step S4 corresponds to the situation illustrated in FIG. 6 as an example.

In the case where a stop space P is not detected in step S4, the controller 10 determines whether the detection of a stop space P for the mobile body 100 is halted (step S5). The detection of a stop space P may be halted in step S5, for example, in the case where the driver of the mobile body 100 turns off the switch such as "stop space detection button". The detection of a stop space P may be halted in step S5, for example, by timeout processing in the case where no stop space P for the mobile body 100 is detected even when a predetermined time has elapsed. The detection of a stop space P may be halted in step S5, for example, in the case where no stop space P for the mobile body 100 is detected within a predetermined distance or range.

In the case where the detection of a stop space P is not halted in step S5, the controller 10 returns to step S3 and continues the operation in the BF mode. In the case where the detection of a stop space P is halted in step S5, the controller 10 switches the operation mode to the normal mode (first mode) (step S6), and ends the operation illustrated in FIG. 7.

In the case where a stop space P is detected in step S4, the controller 10 notifies an ECU of the detection result (step S7).

Having notified the ECU of the detection result in step S7, the controller 10 determines whether to continue the detection of a stop space P (step S8). The detection of a stop space P may be continued in step S8, for example, in the case of detecting a plurality of stop spaces P. The detection of a stop space P may be continued in step S8, for example, in the case where the already detected stop space P is not selected. An example of the case where the already detected stop space P is not selected is when the driver of the mobile body 100 or the like does not select the stop space P. Another example of the case where the already detected stop space P is not selected is when the controller 10 does not select the stop space P according to a predetermined algorithm (e.g. on the ground that the route to the stop space P is hard to be secured).

In the case of continuing the detection of a stop space P in step S8, the controller 10 returns to step S3 and continues the operation in the BF mode. In the case of not continuing the detection of a stop space P in step S8, the controller 10 switches the operation mode to the normal mode (first mode) (step S6), and ends the operation illustrated in FIG. 7.

As described above, in the electronic device 1 according to the embodiment, the controller 10 can perform control to switch between the first mode (e.g. normal mode) and the second mode (e.g. BF mode). In the first mode (normal mode), the controller 10 may transmit first transmission waves from the transmission antennas 40 installed in the mobile body 100. In this case, the controller 10 may control the transmission controller 30 (at least one of the phase controller 32 and the power controller 34) to transmit the transmission waves from the transmission antennas 40 installed in the mobile body 100. In the second mode (BF mode), the controller 10 may transmit second transmission waves beamformed from the transmission antennas 40. In this case, too, the controller 10 may control the transmission controller 30 (at least one of the phase controller 32 and the power controller 34) to transmit the second transmission waves beamformed from the transmission antennas 40 installed in the mobile body 100. In the electronic device 1 according to the embodiment, the controller 10 may perform control to transmit the first transmission waves which are not beamformed from the transmission antennas 40 installed in the mobile body 100 in the first mode. Thus, the electronic device 1 according to the embodiment can use one radar sensor (the sensor 6 or 7) for a plurality of applications, i.e. as a multifunctional radar sensor.

In the electronic device 1 according to the embodiment, the controller 10 may perform control to switch from the first mode to the second mode when detecting a stop space P for the mobile body 100. In this case, the controller 10 may control the transmission controller 30 (at least one of the phase controller 32 and the power controller 34) to switch from the first mode to the second mode. Thus, the electronic device 1 according to the embodiment can accurately detect the stop space P for the mobile body 100.

In the electronic device 1 according to the embodiment, the controller 10 may perform control to detect a certain object around the mobile body 100, based on a result of receiving, by the reception antennas 50, reflected waves R resulting from reflection of the transmission waves T transmitted in the first mode. Moreover, in the electronic device 1 according to the embodiment, the controller 10 may perform control to detect the stop space P for the mobile body 100, based on a result of receiving, by the reception antennas 50, reflected waves R resulting from reflection of the transmission waves T transmitted in the second mode. Thus, the electronic device 1 according to the embodiment can use the transmission waves T transmitted from the sensor 6 and/or 7 suitably depending on the situation.

The controller 10 may perform control to aim the beam of the transmission waves T transmitted in the second mode, in the direction in which the stop space P for the mobile body 100 is detected. The controller 10 may perform control to cause the beam width of the transmission waves transmitted in the second mode to be narrower than the beam width of the transmission waves transmitted in the first mode. Thus, the electronic device 1 according to the embodiment can use the transmission waves T transmitted from the sensor 6 and/or 7 suitably depending on the situation.

In the electronic device 1 according to the embodiment, the controller 10 may perform control to switch between the first mode and the second mode, after switching to the second mode. In this case, the controller 10 may perform control to switch from the second mode to the first mode, after the stop space P for the mobile body 100 is detected.

Another embodiment will be described below.

Figure 8:
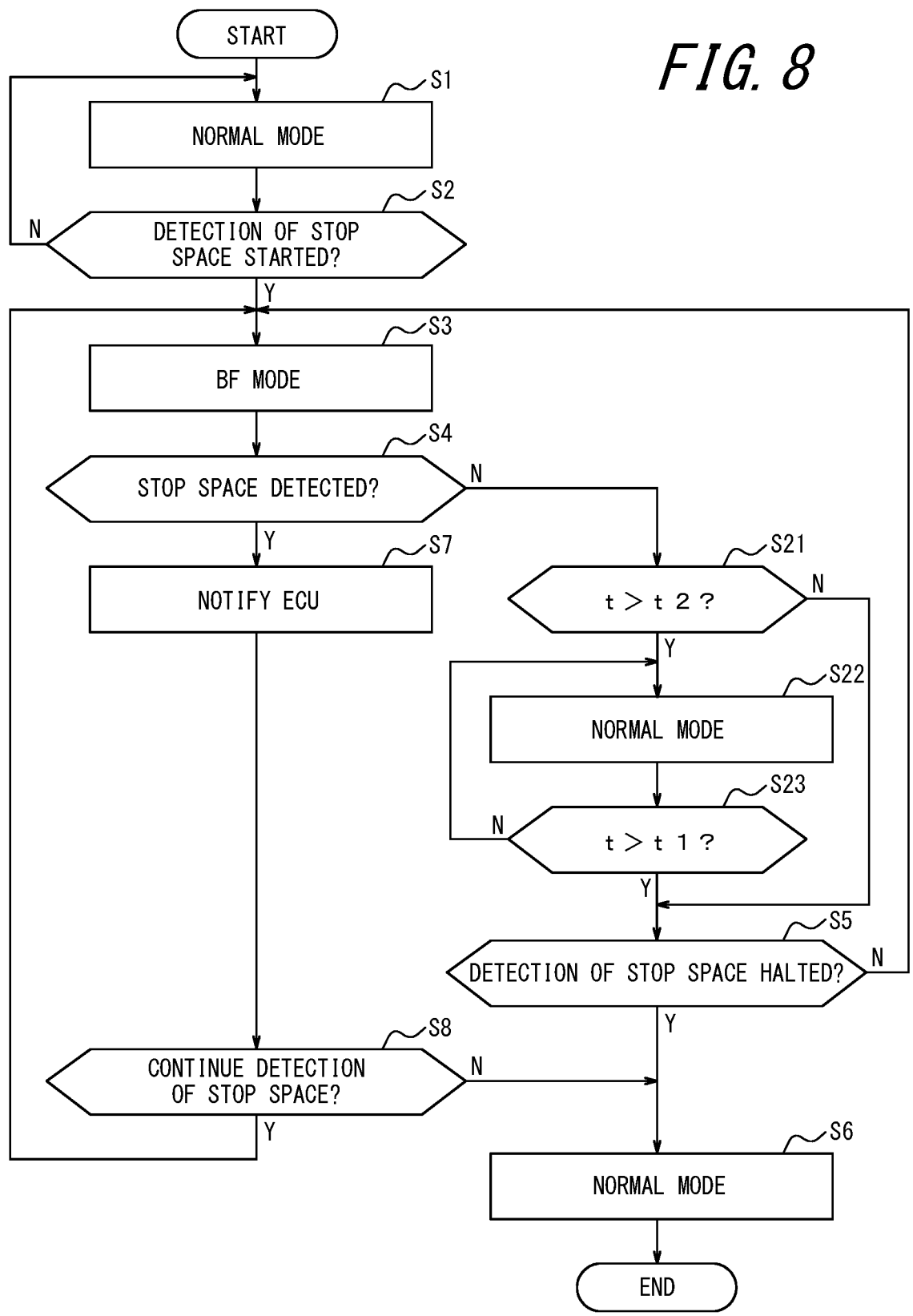
FIG. 8 is a flowchart illustrating another example of operation of the electronic device according to the embodiment.

FIG. 8 is a flowchart illustrating operation of an electronic device 1 according to another embodiment. FIG. 11 is a diagram illustrating part of the operation illustrated in the flowchart in FIG. 8. In the operation illustrated in FIG. 8, processes are further added to the operation of the electronic device 1 according to the embodiment illustrated in FIG. 7. In FIG. 8, the description of the same parts as those in FIG. 7 is simplified or omitted as appropriate.

In the embodiment illustrated in FIG. 7, after starting the operation in the BF mode in step S3, the controller 10 operates in the BF mode until the stop space detection is halted. In another embodiment illustrated in FIG. 8, after starting the operation in the BF mode in step S3, the controller 10 switches the operation mode to the normal mode as appropriate even before the stop space detection is halted. This embodiment will be described below.

In the embodiment illustrated in FIG. 8, after starting the operation in the BF mode in step S3, in the case where no stop space is detected in step S4, the controller 10 determines whether a predetermined time t2 has elapsed after the start of the operation in the BF mode in step S3 (step S21). The predetermined time t2 may be, for example, a time t2 of a predetermined cycle such as a frame rate switching cycle or a chirp signal switching cycle. Here, the controller 10 has a timer function of measuring the time elapsed from a given point in time. In the case where the predetermined time t2 has not elapsed in step S21, the controller 10 may perform the processes from step S5 onward in the same way as in FIG. 7.

In the case where the predetermined time t2 has elapsed in step S21, the controller 10 switches the operation mode from the BF mode to the normal mode (step S22). After switching the operation mode to the normal mode in step S22, the controller 10 determines whether a predetermined time t1 has elapsed (step S23). The predetermined time t1 may be, for example, a time shorter than the predetermined time t2. Specifically, for example, the predetermined times t1 and t2 may be on the order of several milliseconds. The predetermined time t1 may be, for example, a time t1 of a predetermined cycle such as a frame rate switching cycle or a chirp signal switching cycle.

In the case where the predetermined time t1 has not elapsed in step S23, the controller 10 returns to step S22 and continues the operation in the normal mode. In the case where the predetermined time t1 has elapsed in step S23, the controller 10 may perform the processes from step S5 onward in the same way as in FIG. 7.

As described above, in the electronic device 1 according to another embodiment, the controller 10 may perform control to switch between the first mode (normal mode) and the second mode (BF mode), after switching to the second mode (BF mode). In this case, the controller 10 may perform control to cause the operation time t1 in the first mode to be shorter than the operation time t2 in the second mode, after switching to the second mode. The controller 10 may perform control to switch from the second mode to the first mode for each predetermined cycle t2. In this case, for example, the first mode may be continued for the predetermined time t1 shorter than t2.

The electronic device 1 according to another embodiment, even while operating in the second mode after starting the stop space detection, switches to the operation in the first mode at predetermined timing. The electronic device 1 according to another embodiment, even after switching to the operation in the first mode, immediately returns to the operation in the second mode after a relatively short time. By repeating such operation, the electronic device 1 can perform the original detection (first mode) even during the second mode of detecting the stop space. Thus, the electronic device 1 according to another embodiment can detect, for example, any obstacle approaching from behind the mobile body 100 even while detecting the stop space for the mobile body 100, as illustrated in FIGS. 5 and 6.

Yet another embodiment will be described below.

Figure 9:
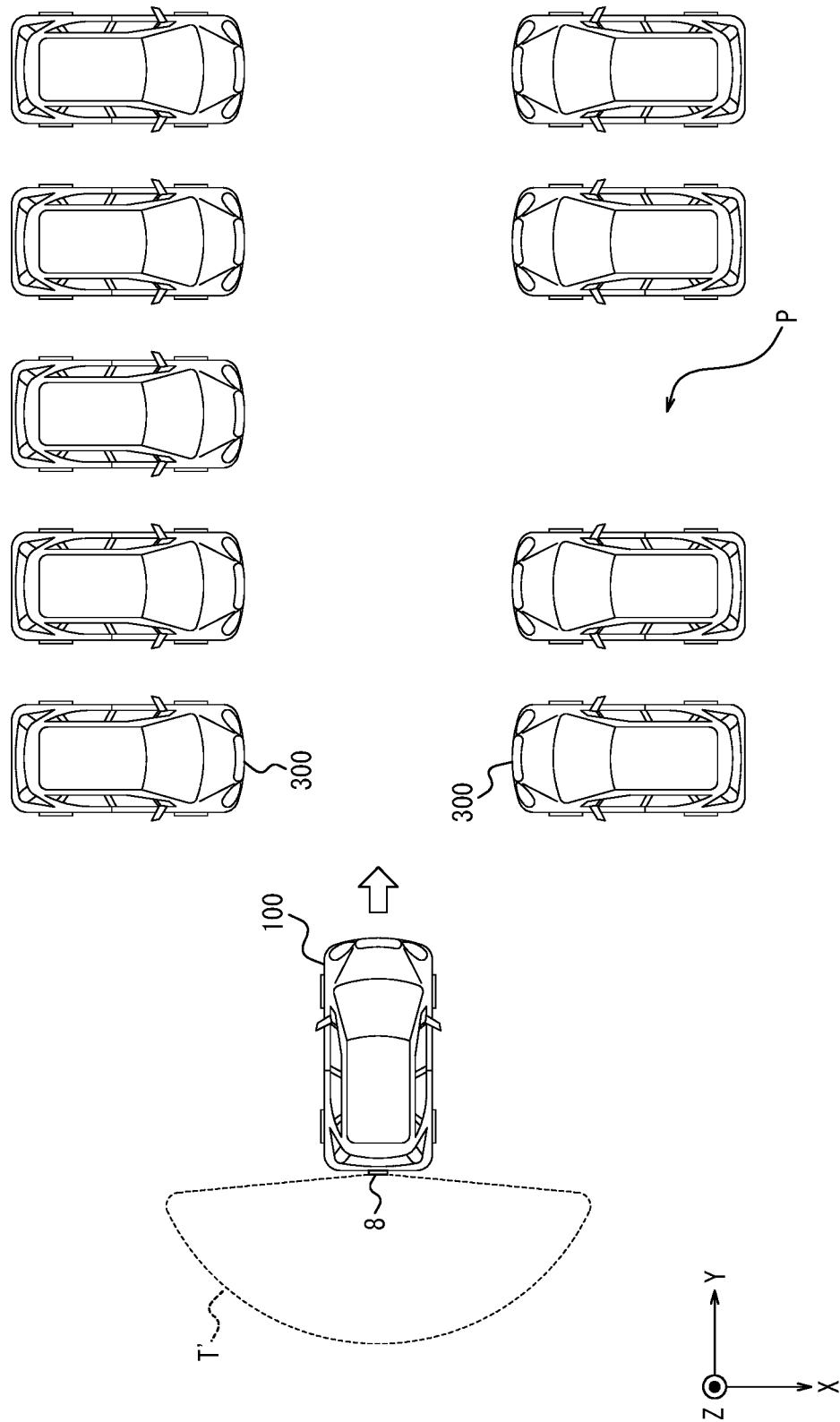
FIG. 9 is a diagram illustrating an example of operation of a modification of the electronic device according to the embodiment.
Figure 10:
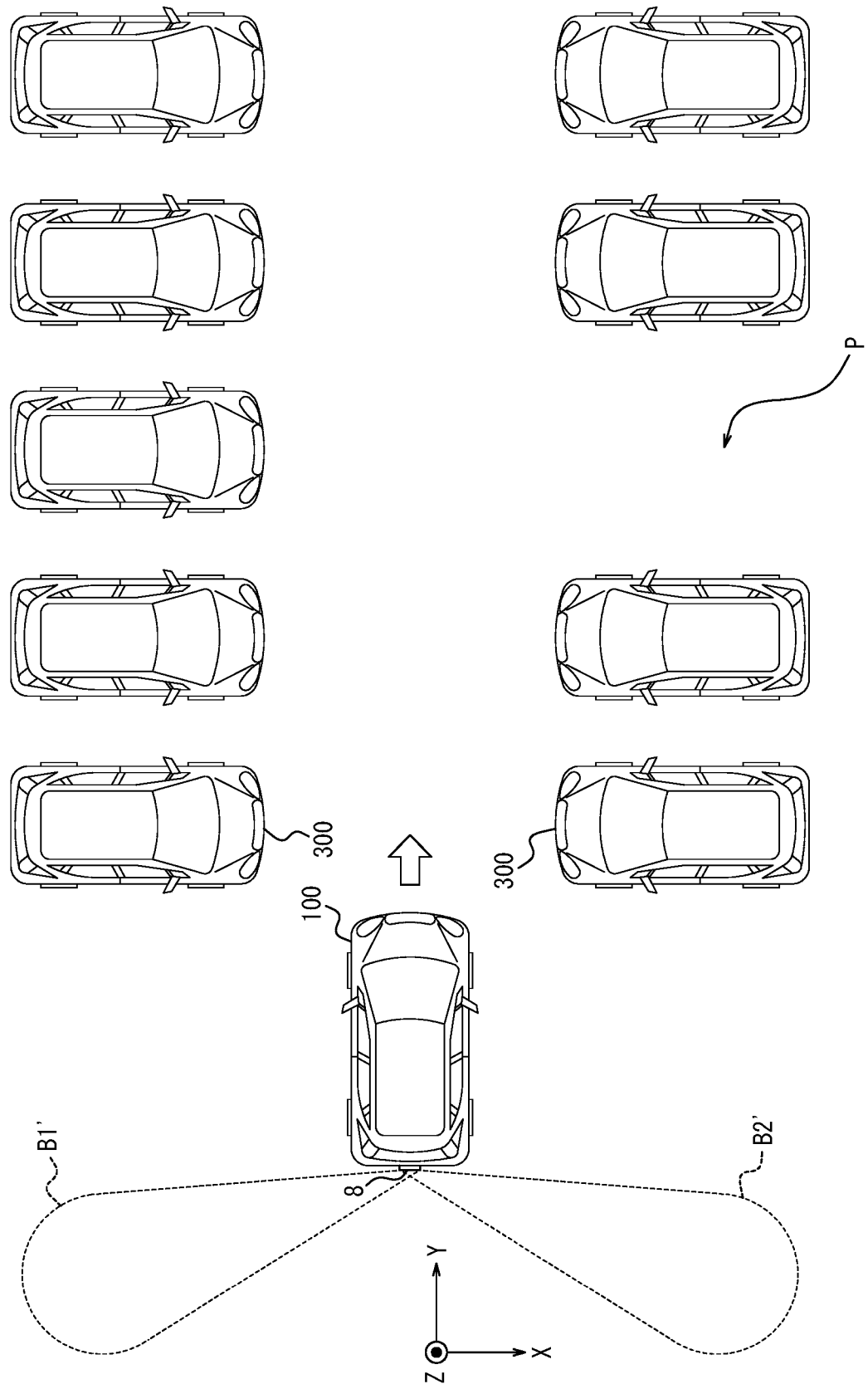
FIG. 10 is a diagram illustrating an example of operation of a modification of the electronic device according to the embodiment.

FIGS. 9 and 10 are each a diagram illustrating an example of operation of an electronic device 1 according to yet another embodiment.

The embodiment illustrated in FIGS. 4 to 6 describes an example in which two sensors, e.g. the sensors 6 and 7, are installed in the mobile body 100. As a result of two sensors, e.g. the sensors 6 and 7, being installed in the mobile body 100, the detection of a stop space can be performed on both the right and left sides with respect to the direction of travel of the mobile body 100, as illustrated in FIGS. 4 to 6.

Yet another embodiment illustrated in FIG. 9 describes an example in which one sensor, e.g. a sensor 8, is installed in the mobile body 100. The sensor 8 illustrated in FIG. 9 includes a plurality of transmission antennas 40, as with the sensors 6 and 7. The electronic device 1 according to the embodiment illustrated in FIG. 9 transmits transmission waves from at least one of the plurality of transmission antennas 40 included in the sensor 8.

The sensor 8 illustrated in FIG. 9 has a broader beam width (transmission range) than the sensors 6 and 7. The transmission range of transmission waves T' transmitted from the sensor 8 may be, for example, an angle of about 160°, as illustrated in FIG. 9. Hence, the electronic device 1 according to the embodiment illustrated in FIG. 9 can achieve, by one sensor such as the sensor 8, a function similar to two sensors such as the sensors 6 and 7 illustrated in FIG. 4, in the first (normal) mode.

The electronic device 1 according to the embodiment illustrated in FIG. 9 may, in the second (BF) mode, change the direction of beamforming of the transmission waves transmitted from at least two of the plurality of transmission antennas 40 included in the sensor 8, depending on the time. For example as illustrated in FIG. 10, at predetermined time tα, the transmission waves transmitted from the plurality of transmission antennas 40 included in the sensor 8 may be subjected to beamforming, to form a beam B1'. For example, at predetermined time tβ, the transmission waves transmitted from the plurality of transmission antennas 40 included in the sensor 8 may be subjected to beamforming, to form a beam B2' of the transmission waves. Thus, by switching the beam of the transmission waves transmitted from the plurality of antennas 40 included in the sensor 8 between the beam B1' and the beam B2' at predetermined short intervals, a function similar to two sensors such as the sensors 6 and 7 illustrated in FIG. 5 can be achieved.

Hence, according to the embodiment illustrated in FIGS. 9 and 10, approximately the same function as two sensors can be achieved by one sensor.

As described above, the electronic device 1 according to the embodiment can accurately detect a stop space P for the mobile body 100. The electronic device 1 according to the embodiment can therefore significantly save time and trouble when the driver of the mobile body 100 or the like detects a stop space P.

While some embodiments and examples of the present disclosure have been described above by way of drawings, various changes and modifications may be easily made by those of ordinary skill in the art based on the present disclosure. Such changes and modifications are therefore included in the scope of the present disclosure. For example, the functions included in the functional parts, etc. may be rearranged without logical inconsistency, and a plurality of functional parts, etc. may be combined into one functional part, etc. and a functional part, etc. may be divided into a plurality of functional parts, etc. Moreover, each of the disclosed embodiments is not limited to the strict implementation of the embodiment, and features may be combined or partially omitted as appropriate. That is, various changes and modifications may be made to the presently disclosed techniques by those of ordinary skill in the art based on the present disclosure. Such changes and modifications are therefore included in the scope of the present disclosure. For example, functional parts, means, steps, etc. in each embodiment may be added to another embodiment without logical inconsistency, or replace functional parts, means, steps, etc. in another embodiment. In each embodiment, a plurality of functional parts, means, steps, etc. may be combined into one functional part, means, step, etc., and a functional part, means, step, etc. may be divided into a plurality of each functional parts, means, steps, etc. Moreover, each of the disclosed embodiments is not limited to the strict implementation of the embodiment, and features may be combined or partially omitted as appropriate.

The foregoing embodiments are not limited to implementation as the electronic device 1. For example, the foregoing embodiments may be implemented as a control method of a device such as the electronic device 1. For example, the foregoing embodiments may be implemented as a control program of a device such as the electronic device 1.

The electronic device 1 according to each of the embodiments may include, for example, at least one of the controller 10 and the transmission controller 30, as a minimum structure. The transmission controller 30 may include at least one of the phase controller 32 and the power controller 34. The electronic device 1 according to the embodiment may include at least one of the signal generator 22, the frequency synthesizer 24, the power amplifier 36, and the transmission antenna 40 illustrated in FIG. 3, in addition to the controller 10 and/or the transmission controller 30. The electronic device 1 according to the embodiment may include at least one of the reception antenna 50, the LNA 52, the mixer 54, the IF unit 56, the AD converter 58, the distance estimator 62, and the angle estimator 64, instead of or together with the foregoing functional parts. The electronic device 1 according to the embodiment can thus have any of various structures. In the case where the electronic device 1 according to the embodiment is mounted in the mobile body 100, for example, at least one of the foregoing functional parts may be installed in an appropriate location such as the inside of the mobile body 100. In an embodiment, for example, at least one of the transmission antenna 40 and the reception antenna 50 may be installed on the outside of the mobile body 100.

The foregoing embodiments describe the case where the stop space P is, when the mobile body 100 is a car, a space for parking or stopping the car. Alternatively, in an embodiment, the stop space may be, for example, a space for anchoring a ship on water or a space for stopping a drone or the like in the air.

The foregoing embodiments describe beamforming mainly from the transmission wave transmitting side. Beamforming may also be used on the side of receiving reflected waves resulting from reflection of transmission waves, to enhance the reception intensity of transmission waves transmitted in a given direction and suppress reception of transmission waves transmitted in other directions.

REFERENCE SIGNS LIST 1 electronic device
5, 6, 7, 8 sensor
10 controller
12 memory
22 signal generator
24 frequency synthesizer
30 transmission controller
32 phase controller
34 power controller
36 power amplifier
40 transmission antenna
50 reception antenna
52 LNA
54 mixer
56 IF unit
58 AD converter
62 distance estimator
64 angle estimator
66 relative speed estimator
100 mobile body
200 object
300 other mobile body

The invention claimed is:

1. An electronic device comprising:
a plurality of transmission antennas installed in a mobile body; and
a controller configured to:
switch between a first mode of transmitting first transmission waves from the transmission antennas and a second mode of transmitting second transmission waves beamformed from the transmission antennas; and
perform control to cause a beam width of the transmission waves transmitted in the second mode to be narrower in azimuth than a beam width of the transmission waves transmitted in the first mode,
wherein the controller is configured to switch from the first mode to the second mode, when a process for detecting a stop space for the mobile body has started,
the controller is configured to perform control to switch between the first mode and the second mode, after switching to the second mode, and
the controller is configured to perform control to cause an operation time in the first mode to be shorter than an operation time in the second mode, after switching to the second mode.

2. The electronic device according to claim 1, wherein the controller is configured to perform control to not beamform the transmission waves transmitted from the transmission antennas in the first mode.

3. The electronic device according to claim 1, wherein the controller is configured to perform control to detect a certain object around the mobile body based on a result of receiving, by a reception antenna, reflected waves resulting from reflection of the transmission waves transmitted in the first mode.

4. The electronic device according to claim 1, wherein the controller is configured to perform control to detect the stop space based on a result of receiving, by a reception antenna, reflected waves resulting from reflection of the transmission waves transmitted in the second mode.

5. The electronic device according to claim 1, wherein the controller is configured to perform control to aim a beam of the transmission waves transmitted in the second mode, in a direction in which the stop space is detected.

6. The electronic device according to claim 1, wherein the controller is configured to perform control to switch from the second mode to the first mode for each predetermined cycle.

7. The electronic device according to claim 1, wherein the controller is configured to perform control to switch from the second mode to the first mode, after the stop space for the mobile body is detected.

8. A control method of an electronic device, the control method comprising:
transmitting first transmission waves from a plurality of transmission antennas installed in a mobile body;
transmitting second transmission waves beamformed from the transmission antennas;
performing control to cause a beam width of the second transmission waves to be narrower in azimuth than a beam width of the first transmission waves;
performing control to switch from the transmitting of the first transmission waves to the transmitting of the second transmission waves, when a process for detecting a stop space for the mobile body has started,
wherein the method comprises performing control to switch between the transmitting of the first transmission waves and the transmitting of the second transmission waves, after switching to the transmitting of the second transmission waves, and
the method comprises performing control to cause an operation time of the transmitting of the first transmission waves to be shorter than an operation time of the transmitting of the second transmission waves, after switching to the transmitting of the second transmission waves.

9. A non-transitory computer-readable recording medium storing computer program instructions, which when executed by an electronic device, cause a computer to:
transmit first transmission waves from a plurality of transmission antennas installed in a mobile body;
transmit second transmission waves beamformed from the transmission antennas;

performing control to cause a beam width of the second transmission waves to be narrower in azimuth than a beam width of the first transmission waves; and perform control to switch from the transmitting of the first transmission waves to the transmitting of the second transmission waves, when a process for detecting a stop space for the mobile body has started, wherein the instructions cause the computer to perform control to switch between the transmitting of the first transmission waves and the transmitting of the second transmission waves, after switching to the transmitting of the second transmission waves, and the instructions cause the computer to perform control to cause an operation time of the transmitting of the first transmission waves to be shorter than an operation time of the transmitting of the second transmission waves, after switching to the transmitting of the second transmission waves.

\* \* \* \* \*